US009582550B2

(12) United States Patent
Hotta et al.

(10) Patent No.: US 9,582,550 B2
(45) Date of Patent: Feb. 28, 2017

(54) INFORMATION PROCESSING APPARATUS AND METHOD FOR DETERMINING TIME CORRECTION VALUES

(71) Applicant: FUJITSU LIMITED, Kawasaki-shi, Kanagawa (JP)

(72) Inventors: Yuuji Hotta, Kawasaki (JP); Motoyuki Kawaba, Kawasaki (JP); Toshihiro Shimizu, Sagamihara (JP); Yasuhiko Kanemasa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 403 days.

(21) Appl. No.: 14/231,924

(22) Filed: Apr. 1, 2014

(65) Prior Publication Data
US 2014/0214896 A1 Jul. 31, 2014

Related U.S. Application Data

(63) Continuation of application No. PCT/JP2011/073923, filed on Oct. 18, 2011.

(51) Int. Cl.
*G06F 17/30* (2006.01)
*G06F 11/34* (2006.01)

(52) U.S. Cl.
CPC .... *G06F 17/30551* (2013.01); *G06F 11/3419* (2013.01); *G06F 11/3495* (2013.01); *G06F 17/30545* (2013.01); *G06F 2201/86* (2013.01)

(58) Field of Classification Search
USPC .............................................. 707/758, 770
See application file for complete search history.

(56) References Cited

U.S. PATENT DOCUMENTS 5,386,542 A 1/1995 Brann et al.
6,085,200 A * 7/2000 Hill .......................... G06F 9/466
(Continued)

FOREIGN PATENT DOCUMENTS

JP 3-77114 4/1991
JP 5-235973 9/1993
(Continued)

OTHER PUBLICATIONS

Patent Abstracts of Japan, Publication No. 2008-269084, Published Nov. 6, 2008.
(Continued)

*Primary Examiner* — Hanh Thai
(74) *Attorney, Agent, or Firm* — Staas & Halsey LLP

(57) ABSTRACT

A first memory stores requester event records describing events that occurred in relation to processes executed in a first server. A second memory stores requestee event records describing events that occurred in relation to processes executed in a second server in response to execution requests issued from the first server. An associating unit searches the first and second memories for requester event records and requestee event records whose transaction identifiers are identical and associates the found records together. A determining unit compares the associated event records with each other in terms of their time information. Based on this comparison, the determining unit determines a correction value for correcting time differences between requester event records in the first memory and requestee event records in the second memory.

14 Claims, 22 Drawing Sheets

(56) References Cited

U.S. PATENT DOCUMENTS

| | | | |
|---|---|---|---|
| 6,865,686 B1 | 3/2005 | Krause et al. | |
| 7,106,843 B1* | 9/2006 | Gainsboro | H04M 3/2281 379/191 |
| 7,240,336 B1* | 7/2007 | Baker | G06F 9/455 714/E11.207 |
| 7,805,416 B1* | 9/2010 | Compton | G06F 17/30112 707/622 |
| 7,814,015 B2* | 10/2010 | Benedyk | G06Q 20/04 705/41 |
| 7,913,256 B2* | 3/2011 | Torii | G06F 9/4887 718/100 |
| 7,965,706 B2* | 6/2011 | Iwakawa | H04L 29/06027 370/360 |
| 8,135,633 B1* | 3/2012 | LeBaron | G06Q 20/10 705/24 |
| 9,323,758 B1* | 4/2016 | Stacey | G06F 17/30097 |
| 2003/0018651 A1* | 1/2003 | Funaki | G06Q 10/109 |
| 2005/0172162 A1* | 8/2005 | Takahashi | G06F 11/0709 714/4.4 |
| 2005/0193277 A1 | 9/2005 | Horikawa et al. | |
| 2005/0240582 A1* | 10/2005 | Hatonen | G06F 17/30539 |
| 2007/0274376 A1* | 11/2007 | Jang | H04N 21/235 375/211 |
| 2007/0294224 A1* | 12/2007 | Heler | G06F 9/466 |
| 2008/0147668 A1* | 6/2008 | Weetman | G06F 17/30067 |
| 2008/0263105 A1 | 10/2008 | Nakamura | |
| 2008/0270594 A1* | 10/2008 | McJilton | G06F 17/30233 709/224 |
| 2009/0006500 A1* | 1/2009 | Shiozawa | G06F 17/30221 |
| 2009/0150395 A1* | 6/2009 | Cha | G06F 17/30176 |
| 2009/0172014 A1* | 7/2009 | Huetter | G06F 17/30551 |
| 2011/0145162 A1* | 6/2011 | Vock | A43B 3/00 705/333 |
| 2011/0185022 A1 | 7/2011 | Yokoyama | |
| 2011/0264956 A1* | 10/2011 | Ito | G06F 11/0748 714/20 |
| 2012/0149325 A1* | 6/2012 | Titus | H04M 11/04 455/404.2 |
| 2012/0173629 A1* | 7/2012 | Drope | G06F 17/30017 709/204 |
| 2012/0284295 A1* | 11/2012 | Wang | G06F 17/30457 707/769 |
| 2013/0031414 A1* | 1/2013 | Dhuse | G06F 11/0727 714/37 |

FOREIGN PATENT DOCUMENTS

| | | |
|---|---|---|
| JP | 2002-510081 | 4/2002 |
| JP | 2005-235054 | 9/2005 |
| JP | 2006-11683 | 1/2006 |
| JP | 2008-269084 | 11/2008 |
| JP | 2011-154489 | 8/2011 |
| JP | 2011-158969 | 8/2011 |
| WO | WO 99/50722 | 10/1999 |

OTHER PUBLICATIONS

Japanese Office Action dated Feb. 3, 2015 in corresponding Japanese Patent Application No. 2013-539436.
Patent Abstracts of Japan, Publication No. 3-77114, Published Apr. 2, 1991.
Patent Abstracts of Japan, Publication No. 5-235973, Published Sep. 10, 1993.
Patent Abstracts of Japan, Publication No. 2005-235054, Published Sep. 2, 2005.
Patent Abstracts of Japan, Publication No. 2006-11683, Published Jan. 12, 2006.
Patent Abstracts of Japan, Publication No. 2011-154489, Published Aug. 11, 2011.
Patent Abstracts of Japan, Publication No. 2011-158969, Published Aug. 18, 2011.
International Search Report mailed Nov. 22, 2011 in corresponding International Patent Application No. PCT/JP2011/073923.

* cited by examiner

WEB MESSAGE STORAGE UNIT — 120

121 WEB MESSAGE MANAGEMENT TABLE

| TIME STAMP | TYPE (req/res) | URL | SESSION ID | TRANSACTION ID |
|---|---|---|---|---|
| 1296721352.555546 | req | http://foo.co.jp/myapp/login | ses001 | - |
| 1296721352.555596 | res | - | ses001 | http-8080-2-11 |
| 1296721352.555886 | req | http://foo.co.jp/myapp/setdata | ses003 | - |
| 1296721352.557576 | res | - | ses003 | http-8080-2-15 |
| ... | ... | ... | ... | ... |

FIG. 7

130 APPLICATION MESSAGE STORAGE UNIT

131 APPLICATION MESSAGE MANAGEMENT TABLE

| START/END | TRANSACTION ID | TIME STAMP | CLASS NAME | METHOD NAME |
|---|---|---|---|---|
| E | http-8080-3-0 | 1310545073589963 | java.util.concurrent.atomic.AtomicLong | #incrementAndGet |
| S | http-8080-3-0 | 1310545073589973 | javax.management.ObjectName | #ObjectName |
| S | http-8080-2-4 | 1310545073589978 | java.util.logging.Logger | #isLoggable |
| S | http-8080-3-0 | 1310545073589982 | javax.management.ObjectName | #construct |
| S | http-8080-2-4 | 1310545073589984 | java.util.logging.Level | #intValue |
| S | http-8080-3-0 | 1310545073589987 | javax.management.ObjectName | #addProperty |
| E | http-8080-2-4 | 1310545073589990 | java.util.logging.Level | #intValue |
| E | http-8080-3-0 | 1310545073589991 | javax.management.ObjectName | #addProperty |
| E | http-8080-2-4 | 1310545073589993 | java.util.logging.Logger | #isLoggable |
| S | http-8080-3-0 | 1310545073589995 | javax.management.ObjectName | #addProperty |
| E | http-8080-3-0 | 1310545073589996 | javax.management.ObjectName | #addProperty |
| S | http-8080-3-0 | 1310545073589998 | javax.management.ObjectName | #addProperty |

151     FITTABLE TIME RANGE INFORMATION

| APPLICATION-LAYER MESSAGE PAIR | DATABASE-LAYER MESSAGE | FITTABLE TIME RANGE |
|---|---|---|
| 3.10 to 3.20, tid1 | 3.05, tid1 | +0.05 to +0.15 |
| 3.30 to 3.40, tid2 | 3.31, tid2 | −0.01 to +0.09 |
| 3.50 to 3.59, tid3 | 3.43, tid3 | +0.07 to +0.16 |

FIG. 12

152 INVESTIGATION RESULT OF FITNESS RATIOS

| CANDIDATE CORRECTION VALUES | FITNESS RATIO | tid1 | tid2 | tid3 |
|---|---|---|---|---|
| -0.01 | 33.3% |  | 1 |  |
| 0.00 | 33.3% |  | 1 |  |
| 0.01 | 33.3% |  | 1 |  |
| 0.02 | 33.3% |  | 1 |  |
| 0.03 | 33.3% |  | 1 |  |
| 0.04 | 33.3% |  | 1 |  |
| 0.05 | 66.7% | 1 | 1 |  |
| 0.06 | 66.7% | 1 | 1 |  |
| 0.07 | 100.0% | 1 | 1 | 1 |
| 0.08 | 100.0% | 1 | 1 | 1 |
| 0.09 | 100.0% | 1 | 1 | 1 |
| 0.10 | 66.7% | 1 |  | 1 |
| 0.11 | 66.7% | 1 |  | 1 |
| 0.12 | 66.7% | 1 |  | 1 |
| 0.13 | 66.7% | 1 |  | 1 |
| 0.14 | 66.7% | 1 |  | 1 |
| 0.15 | 66.7% | 1 |  | 1 |
| 0.16 | 33.3% |  |  | 1 |

81 FITNESS RATIO GRAPH

FIG. 18

INVESTIGATION RESULT OF FITNESS RATIOS AND COVERAGE RATIOS

153

| CANDIDATE CORRECTION VALUE | FITNESS RATIO | tid1 | tid2 | tid3 | msg#1 | msg#2 | msg#3 | msg#4 | msg#5 | msg#6 | COVERAGE RATIO |
|---|---|---|---|---|---|---|---|---|---|---|---|
| -0.01 | 33.3% |  | 1 |  |  |  |  |  |  |  | 50.0% |
| 0 | 33.3% |  | 1 |  |  | 1 | 1 | 1 |  | 1 | 33.3% |
| 0.01 | 33.3% |  | 1 |  |  |  | 1 |  |  | 1 | 33.3% |
| 0.02 | 33.3% |  | 1 |  |  |  | 1 |  |  | 1 | 33.3% |
| 0.03 | 33.3% |  | 1 |  |  |  | 1 |  |  | 1 | 33.3% |
| 0.04 | 33.3% |  | 1 |  |  |  | 1 |  |  | 1 | 33.3% |
| 0.05 | 66.7% | 1 | 1 |  | 1 |  | 1 |  |  | 1 | 50.0% |
| 0.06 | 66.7% | 1 | 1 |  | 1 |  | 1 |  |  | 1 | 50.0% |
| 0.07 | 100.0% | 1 | 1 | 1 | 1 |  | 1 |  | 1 | 1 | 66.7% |
| 0.08 | 100.0% | 1 | 1 | 1 | 1 |  | 1 |  | 1 | 1 | 66.7% |
| 0.09 | 100.0% | 1 | 1 | 1 | 1 | 1 | 1 | 1 | 1 | 1 | 100.0% |
| 0.10 | 66.7% | 1 |  | 1 | 1 | 1 |  | 1 | 1 | 1 | 66.7% |
| 0.11 | 66.7% | 1 |  | 1 | 1 | 1 |  | 1 | 1 |  | 66.7% |
| 0.12 | 66.7% | 1 |  | 1 | 1 | 1 |  | 1 | 1 |  | 66.7% |
| 0.13 | 66.7% | 1 |  | 1 | 1 | 1 |  | 1 | 1 |  | 66.7% |
| 0.14 | 66.7% | 1 |  | 1 | 1 | 1 |  | 1 | 1 |  | 66.7% |
| 0.15 | 66.7% |  |  | 1 | 1 | 1 |  | 1 | 1 |  | 66.7% |
| 0.16 | 33.3% |  |  | 1 |  |  |  | 1 | 1 |  | 50.0% |

INFORMATION PROCESSING APPARATUS AND METHOD FOR DETERMINING TIME CORRECTION VALUES

CROSS-REFERENCE TO RELATED APPLICATION

This application is a continuation application of International Application PCT/JP2011/073923 filed on Oct. 18, 2011 which designated the U.S., the entire contents of which are incorporated herein by reference.

FIELD

The embodiments discussed herein relate to an information processing apparatus and a method for determining time correction values.

BACKGROUND

There has been a system that provides service to users via a network such as the Internet by running web application software and the like. This system is operated under appropriate management to provide stable services to the users. The operation and management of such systems involves, for example, measurement of system performance for the purpose of monitoring the system's response to user requests and detecting a possible delay. The performance measurement items may include, for example, processing time of each executed process, which begins with reception of a request and ends with transmission of a response to the requesting user. Another measurement item is processing time consumed for database access. In the case of multiple-layer systems such as a web three-layer system made up of web layer, application layer, and database layer, the above measurement may be achieved by using some existing techniques of transaction analysis. For example, one proposed technique collects messages from the network and investigates them to find out how transactions are processed in the system.

As mentioned above, the processing time of a transaction may be measured on the basis of messages produced during the transaction. This measurement begins with identifying such messages. Suppose, for example, that a transaction has invoked a process in an upper layer of a multiple-layer system. The execution period of this process is identified by finding a request message and a response message that relate to the process. When there is found a request message sent to a lower layer of the system during the execution period of the upper-layer process, the found request message is associated with the upper-layer request and response messages, because these messages are deemed to be relating to the same transaction.

The above method includes determination of whether a lower-layer request message has been transmitted within the execution period of an upper-layer process. This determination is made on the basis of time information indicating the occurrence of events such as transmission and reception of messages. For a correct determination, it is important that these events can be put into a time sequence with high accuracy.

In some cases, information about message transmissions and other events is collected at a plurality of different devices. The real-time clocks in these devices are supposed to be synchronized with each other for an enhanced accuracy in determining temporal relationships of events. For example, an existing technique makes a local time base synchronize with a central time base. See, for example, the following literature:

Japanese Laid-open Patent Publication No. 2006-011683
Japanese National Publication of International Patent Application No. 2002-510081

However, simply synchronizing real-time clocks may be insufficient in some cases such as when several message-capturing devices are used to collect information about events that occur in different servers. Even if the exact synchronism of real-time clocks is achieved among those capturing devices, the precise moment of time stamping may differ from device to device because the time-stamping process in one device is running independently of those in other devices. Such time differences in the time stamping may result in inconsistency of collected time information. This also happens in the case where several event-capturing processes in a single device are used to collect event information of different servers.

As can be seen from the above discussion, the time information contained in collected event records may have some inconsistencies, which spoil the accuracy of determination as to the relative order of observed events such as transmission and reception of messages. While these event records may be subjected to transaction analysis, the resulting output would be less confident because of the above reasons.

The conventional systems lack the capability of determining correction values for correcting time information of events that occurred in different servers. That is, they are unable to compensate for the possible time differences in event records of server processes which are collected by using several different capturing devices or processes.

SUMMARY

According to an aspect of the embodiments to be discussed herein, there is provided an information processing apparatus including a memory and a processor. The memory is configured to store requester event records describing events that occurred in relation to processes executed in a first server as part of transactions, the requester event records each including time information indicating occurrence time of an event and a transaction identifier indicating a transaction that invoked that event. The memory also stores requestee event records describing events that occurred in relation to processes executed in a second server in response to execution requests issued from the first server as part of the transactions, the requestee event records each including time information indicating occurrence time of an event in the second server and a transaction identifier indicating a transaction that invoked that event. The processor is configured to perform a process including: searching the memory to find requester event records and requestee event records whose transaction identifiers are identical and associating the found requester event records with the found requestee event records, comparing the associated requester event records and requestee event records with each other in terms of the time information thereof, and determining a correction value for correcting time differences between the time information of the requester event records and the time information of the requestee event records, based on a result of the comparing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 exemplifies a data structure of an application message storage unit;

FIG. 12 exemplifies an investigation result of fitness ratios;

FIG. 18 exemplifies an investigation result of fitness ratios and coverage ratios;

DESCRIPTION OF EMBODIMENTS

Several embodiments will be described below with reference to the accompanying drawings. The embodiments discussed herein may be combined with each other, unless they have contradictory features.

(a) First Embodiment

Figure 1:
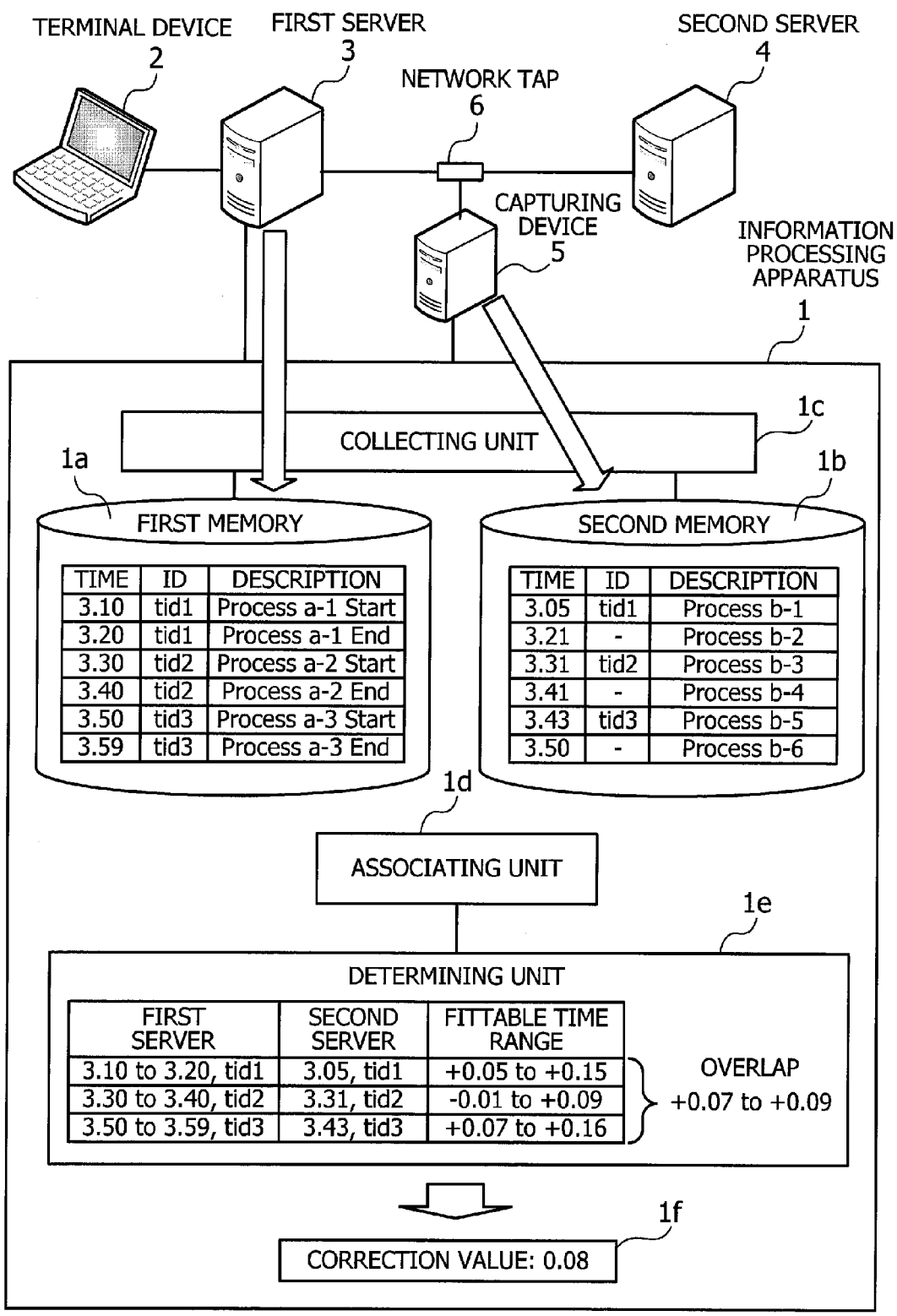
FIG. 1 exemplifies a system structure according to a first embodiment.

FIG. 1 exemplifies a system structure according to a first embodiment. The illustrated system includes, for example, an information processing apparatus 1, a terminal device 2, a first server 3, a second server 4, and a capturing device 5.

The terminal device 2 transmits a processing request to the first server 3 in response to a user input, for example. The first server 3 and second server 4 run in a coordinated way to perform transaction processing in response to processing requests from the terminal device 2. For example, the first server 3 functions as a web server and application server while the second server 4 functions as a database server. The first server 3 executes web services and application processing services as requested by the terminal device 2. In this course, the first server transmits request messages to the second server 4 to make access to some data managed by the second server 4. These request messages may each contain the identifier of a specific transaction. Upon receipt of such a request message, the second server 4 makes access to the requested data and sends a response message back to the first server 3 to provide the result of the data access operation.

In this system of the first embodiment, each of the first server 3 and second server 4 has the function of recording information about events related to the transaction processing. For example, the first server 3 produces a piece of information describing a starting event when it starts a part of transaction processing initiated by a request message. The first server 3 also produces another piece of information describing a closing event when its processing comes to an end. These pieces of information are referred to as "event records." The first server 3 includes time information in each event record to indicate when the event occurred. The first server 3 also produces a unique identifier of the executed transaction and includes it in the event records. The first server 3 accumulates such event records in its local storage device.

A network tap 6 is placed on the communication path between the first server 3 and second server 4, and a capturing device 5 is attached to this network tap 6. The first server 3 and second server 4 exchange packets over the communication path, while the network tap 6 sends a copy of these packets to the capturing device 5. The capturing device 5 analyzes the packets received from the network tap 6 to reproduce therefrom request messages from the first server 3 to the second server 4, as well as response messages from the second server 4 to the first server 3. The capturing device 5 then stores event records in its local storage device to record the occurrence of each event indicated by these messages, including time information representing when that event occurred. The capturing device 5 also includes a transaction identifier in the event records when it is contained in the captured messages.

The illustrated information processing apparatus 1 includes a first memory 1a, a second memory 1b, a collecting unit 1c, an associating unit 1d, and a determining unit 1e.

The first memory 1a stores information about events that occurred in relation to processes executed in the first server 3 as part of particular transactions. Since the first server 3 is a requester (i.e., it sends requests to the second server 4) in the example of FIG. 1, this information is referred to as "requester event records" and includes time information that indicates the occurrence time of events, as well as identifiers indicating source transactions of the same. Referring to the example of event records in the first memory 1a of FIG. 1, the description field provides some details of those events in the first server 3, including information about their corresponding processes and whether the recorded event is a starting event or a closing event.

The second memory 1b stores information about events that occurred in relation to some processes executed by the second server 4 in response to execution requests issued from the first server 3 as part of transactions. Since the second server 4 is a requestee (i.e., it receives requests from the first server 3) in the example of FIG. 1, this information is referred to as "requestee event records" and includes time information that indicates occurrence times of recorded events, as well as identifiers indicating source transactions of the same. Referring to the example of event records in the second memory 1b of FIG. 1, the description field provides information about processes associated with the recorded events.

It is noted that transaction identifiers are missing in some event records in the first memory 1a and second memory 1b. In the example of FIG. 1, every requester event record in the first memory 1a has a transaction identifier, but the requestee event records seen in the second memory 1b of FIG. 1 include those having transaction identifiers and those having no transaction identifiers. The latter group of event records are referred to as "unlabeled event records" in this description.

The collecting unit 1c collects requester event records from the capturing device 5 and stores the collected records in the first memory 1a, where the requester event records relate to specific processes executed in the first server 3. The collecting unit 1c also collects requestee event records from the second server 4 and stores the collected records in the second memory 1b, where the requestee event records relate to specific processes executed in the second server 4.

The associating unit 1d searches the first memory 1a and second memory 1b to find requester event records and requestee event records whose transaction identifiers are identical. The associating unit 1d associates the found requester event records with the found requestee event records.

The determining unit 1e compares the associated requester event records and requestee event records with each other in terms of their time information. Based on this comparison, the determining unit 1e determines a correction value if for correcting time differences between the time information of requester event records stored in the first memory 1a and that of requestee event records stored in the second memory 1b.

For example, the determining unit 1e produces an event record pair from two requester event records, one indicating the start of a process executed in the first server and the other indicating the end of that process. Then based on the time information in each requester event record constituting the event record pair, the determining unit 1e determines the execution period of a process. There may be a requestee event record that has the same transaction identifier as the two requester event records constituting the produced event record pair, and the time indicated by time information of this requestee event record may fall within the execution period determined above if the time is corrected. The determining unit 1e determines a range of possible time correction values that would make the time information of such a requestee event record fit into the execution period. This range is referred to as the "fittable time range" in this description. The determining unit 1e selects a correction value if within this fittable time range. For example, the determining unit 1e calculates a fittable time range for each requestee event record having a transaction identifier, thus obtaining a plurality of fittable time ranges corresponding to different requestee event records. The determining unit 1e then selects a correction value if out of an overlapping portion of these fittable time ranges.

In operation of the above-described system, the first server 3 and second server 4 execute some processes of transaction processing in response to a processing request from the terminal device 2. The capturing device 5 captures information about the processes executed in the first server 3 and stores this information in the form of requester event records. The second server 4, on the other hand, stores requestee event records about the processes executed in the second server 4 itself. If the internal clock of the capturing device 5 is not exactly synchronized with that of the second server 4, their time difference may cause some discrepancies in the time information to be added to their respective event records. To solve this problem, the information processing apparatus 1 is configured to determine a correction value if in the following way.

For example, the collecting unit 1c in the information processing apparatus 1 collects requester event records from the capturing device 5 and stores the collected records in the first memory 1a. The collecting unit 1c also collects requestee event records from the second server 4 and stores the collected records in the second memory 1b. The associating unit 1d then finds requester event records and requestee event records having the same transaction identifier and associates them together. Referring to the example seen in FIG. 1, the topmost two requester event records stored in the first memory 1a have a transaction identifier of "tid1," as does the topmost requestee event record stored in the second memory 1b. These three records are associated together. Similarly, another transaction identifier "tid2" is found in two requester event records and one requestee event record in FIG. 1. These three records are also associated together. The same applies to yet another three records sharing a transaction identifier of "tid3" in FIG. 1.

The determining unit 1e then determines a correction value if from the above records. For example, the determining unit 1e further examines requester event records having a particular transaction identifier to figure out which record indicates the start of a process and which record indicates the end of that process. If such a pair of requester event records are found, the determining unit 1e then determines the execution time of the process, based on time information in the found records. Referring to the example of FIG. 1, the execution period of first-server process tid1 (i.e., process executed in the first server 3 in relation to a transaction with an identifier of "tid1") is "3.10 to 3.20" (s). Similarly, the execution period of first-server process tid2 is "3.30 to 3.40" (s), and that of first-server process tid3 is "3.50 to 3.59" (s).

Then, for each requestee event record having a particular transaction identifier, the determining unit 1e determines a fittable time range, i.e., the amount of time correction that would make the time information of the requestee event record fit into the execution period indicated by two requester event records having that particular transaction identifier. In the example of FIG. 1, the time information of second-server event record tid1 (i.e., event record collected from the second server 4, with a transaction identifier of "tid1") indicates "3.05" (s). This time information "3.05" (s) would fit into the above-noted execution period "3.10 to 3.20" (s) of the first-server process tid1 if it is corrected with an appropriate correction value in the range of +0.05 to +0.15. In other words, the fittable time range of second-server process tid1 is +0.05 to +0.15. This calculation similarly applies to the time information "3.31" (s) of second-server event record tid2. Its fittable time range is calculated to be −0.01 to +0.09 as seen in FIG. 1. Likewise, the time information of second-server event record tid3 indicates "3.43" (s), and its fittable time range is calculated to be +0.07 to +0.16.

The determining unit 1e now determines a correction value if based on the fittable time ranges calculated above for different event records of transactions in the second server 4. For example, the determining unit 1e may select a correction value if out of an overlapping portion of the fittable time ranges calculated for different transactions.

Referring again to the example of FIG. 1, the three fittable time ranges overlap in +0.07 to +0.09 (s). The determining unit 1e now selects "0.08" as the correction value 1f, which is the median of this overlap.

As can be seen from the above description, the first embodiment is configured to associate records of events in the first server 3 with those in the second server 4 based on their transaction identifiers and then determine a correction value if by comparing time information in the associated event records. The determined correction value if is used to cancel the time differences of requester event records in the first memory 1a relative to requestee event records in the second memory 1b. This time correction makes it possible to sort the requester event records and requestee event records precisely in the order of occurrence of events. The proposed time correction techniques may also be applied to event records having no transaction identifiers as will be described in another embodiment. It is therefore possible to collect information about each individual transaction exhaustively and accurately. The accurate information enables measurement of execution times of various processes in a transaction, from applications to communication with remote entities. These features contribute accurate performance monitoring, troubleshooting, and bottleneck detection of a system, as well as enhanced confidence of transaction analysis.

In the example of FIG. 1, the determined correction value if is intended for correcting time information in requestee event records in the second memory 1b. Since time differences are relative in nature, it is also possible to configure the determining unit 1e to determine a correction value for requester event records in the first memory 1a. When this alternative is applied to the example of FIG. 1, the requester event records in the first memory 1a will be corrected by a correction value of –0.08, which is obtained by reversing the sign of the correction value if "0.08" seen in FIG. 1.

The above-described collecting unit 1c, associating unit 1d, and determining unit 1e may be implemented by using a central processing unit (CPU) in the information processing apparatus 1. The first memory 1a and second memory 1b may be implemented as part of a random access memory (RAM) or a hard disk drive (HDD) or other data storage devices in the information processing apparatus 1. It is also noted that the lines running among the functional blocks in FIG. 1 represent some of their communication paths. FIG. 1 omits some communication paths for simplicity purposes. The person skilled in the art would appreciate that there may be other communication paths in actual implementations.

(b) Second Embodiment

This section describes a second embodiment which offers an analyzer apparatus for analyzing transactions. The proposed analyzer apparatus determines a correction value for time information in given source data before starting transaction analysis.

As an example, the second embodiment assumes a web three-layer system that provides services using World Wide Webs (WWW). This web three-layer system is formed from the following three layers: web layer that serves as an entrance to WWW services, application layer that performs various kinds of data processing, and database layer that manages data for that processing. These layers operate together to handle transactions of WWW services. Web layer is the topmost layer of this web three-layer system. Application layer and database layer are located below the web layer in that order.

The second embodiment is configured to collect "message records" of servers, which describe what messages were sent and received by the servers. These message records are an example of "event records" discussed in the first embodiment. For example, a request message received by a server indicates that a starting event of a specific process has occurred in the receiving server. Similarly, a response message transmitted from a server indicates that a closing event of a specific process has occurred in the transmitting server.

Figure 2:
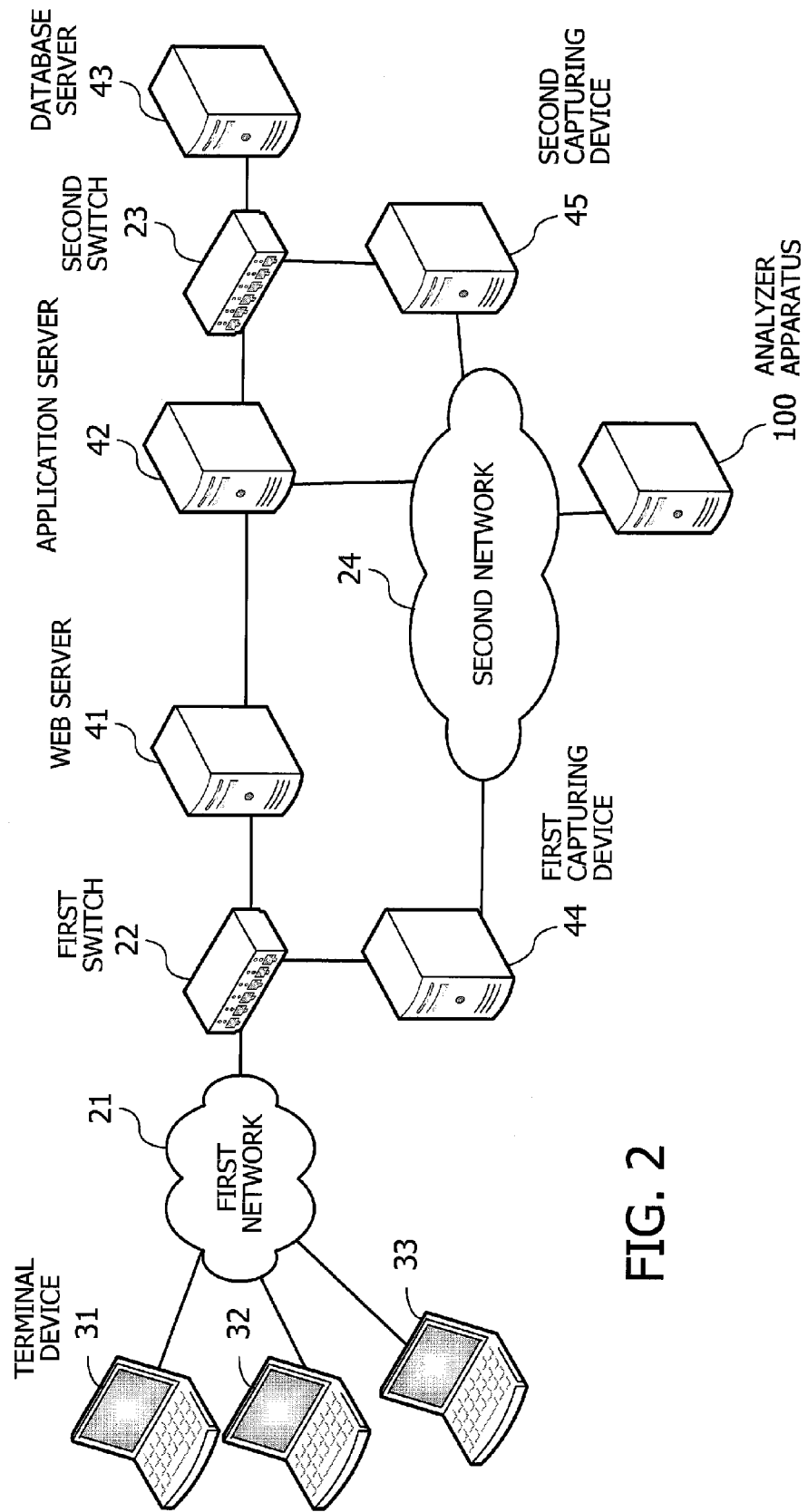
FIG. 2 exemplifies an overall system structure according to a second embodiment.

FIG. 2 exemplifies an overall system structure according to the second embodiment. The system seen in FIG. 2 includes a web three-layer system to provide service to users. In this system, terminal devices 31 to 33 are connected to a web server 41 via a first network 21 and a first switch 22. The terminal devices 31 to 33 may be computers, mobile terminals, or any other devices used by the recipients of service.

The first switch 22 may be, for example, a layer-2 switch. The first switch 22 has a capture port through which a copy of packet signals passing through the first switch 22 is sent out to a first capturing device 44 attached thereto.

The web server 41 is a computer having data communication functions of WWW. The web server 41 executes requests received from the terminal devices 31 to 33 and returns the result to them. During the course of execution, the web server 41 may send a processing request to the application server 42 to use some of its processing services. This request is executed by the application server 42, and the web server 41 receives a result from the same.

More specifically, when a request message is received from terminal devices 31 to 33, the web server 41 generates a transaction ID to uniquely identify a transaction to be executed for the request message. The web server 41 attaches this transaction ID to its own request message to the application server 42 when it delegates some part of the transaction to the application server 42. The web server 41 also attaches the same transaction ID to a response message when it returns the processing result of the transaction.

The application server 42 is a computer configured to run various kinds of application software. The application server 42 executes requests received from the web server 41 and returns the result to the web server 41. During the course of execution, the application server 42 may send a processing request to the database server 43 when it has to access some data managed by the database server 43. This data access request is executed by the database server 43, and the application server 42 receives a result from the same. The application server 42 also records a log of messages (application messages) transmitted and received in connection with the executed processes, together with their respective time stamps (time information).

The application server 42 includes a transaction ID in at least some of its request messages to the database server 43. This transaction ID is the one contained in a preceding request message that the application server 42 has received from the web server 41.

The database server 43, linked to the application server 42 via a second switch 23, is a computer for managing databases. The database server 43 executes requests received from the application server 42 and returns the result to the application server 42.

The second switch 23 may be, for example, a layer-2 switch. This second switch 23 has a capture port through which a copy of packet signals passing through the second switch 23 is sent to a second capturing device 45 attached thereto.

The first capturing device 44 is a computer configured to collect packets transmitted between each terminal device 31 to 33 and the web server 41 via the first switch 22. The first capturing device 44 analyzes the captured packets to extract messages (web messages) contained in them and stores these messages together with their respective time stamps.

The second capturing device 45 is a computer configured to collect packets transmitted between the application server 42 and database server 43 via the second switch 23. The second capturing device 45 analyzes the captured packets to extract messages (database messages) contained in them and stores these messages together with their respective time stamps.

An analyzer apparatus 100 is linked to the above application server 42 and two capturing devices 44 and 45 via a second network 24. This analyzer apparatus 100 is a computer configured to analyze a series of transactions executed by the web server 41, application server 42, and database server 43. More specifically, the analyzer apparatus 100 communicates with the first capturing device 44 to collect information about messages exchanged between each terminal device 31 to 33 and the web server 41. The analyzer apparatus 100 also communicates with the application server 42 to collect information about messages exchanged between the web server 41 and the application server 42. The analyzer apparatus 100 further communicates with the second capturing device 45 to collect information about messages exchanged between the application server 42 and the database server 43. The analyzer apparatus 100 then subjects the collected information (message records) to transaction analysis. For example, the analysis reveals average processing times in each server, for different types of transactions.

During the course of the analysis, the analyzer apparatus 100 associates two or more messages together when they are found related to a single transaction. Such message analysis permits the analyzer apparatus 100 to calculate, for example, processing times in each layer where the transactions take place.

The execution period of a lower-layer process is supposed to be contained in that of an upper-layer process when these two processes belong to a single transaction. This means that a lower-layer request message and its corresponding response message of a particular transaction are supposed to occur within a period between an upper-layer request message and its corresponding response message of that same transaction. In other words, if some collected upper-layer message and lower-layer messages are found to have such relationships of temporal containment, it means that they form a set of messages issued in a single transaction. This condition may be tested by sorting the messages into a time series and examining their temporal containment relationships.

If the time stamp of every message is sufficiently accurate, the analyzer apparatus 100 will be able to correctly sort the messages in temporal order. In the system of the second embodiment, however, time stamps are produced at several different devices. More specifically, web messages are time-stamped at the first capturing device 44. Application messages are time-stamped at the application server 42. Database message are time-stamped at the second capturing device 45. The internal real-time clocks of these three devices may have some time difference, thus making their time stamps inconsistent. Even if the internal clocks of the application server 42 and first and second capturing devices 44 and 45 are nicely synchronized, it does not mean that the software processes operate exactly in the same way to generate time stamps. The result is a small amount of difference in the order of, for example, 0.01 seconds. Such time differences make it difficult to sort messages in the order that they were transmitted.

In view of the above, the proposed analyzer apparatus 100 is configured to calculate a correction value for adjusting the time values of messages that were time-stamped by different devices, so that time-corrected messages are placed along the time line. This feature of time correction permits the analyzer apparatus 100 to properly reproduce the temporal containment relationships between upper-layer processes and lower-layer processes. The analyzer apparatus 100 is thus able to identify a set of messages in a single transaction.

Figure 3:
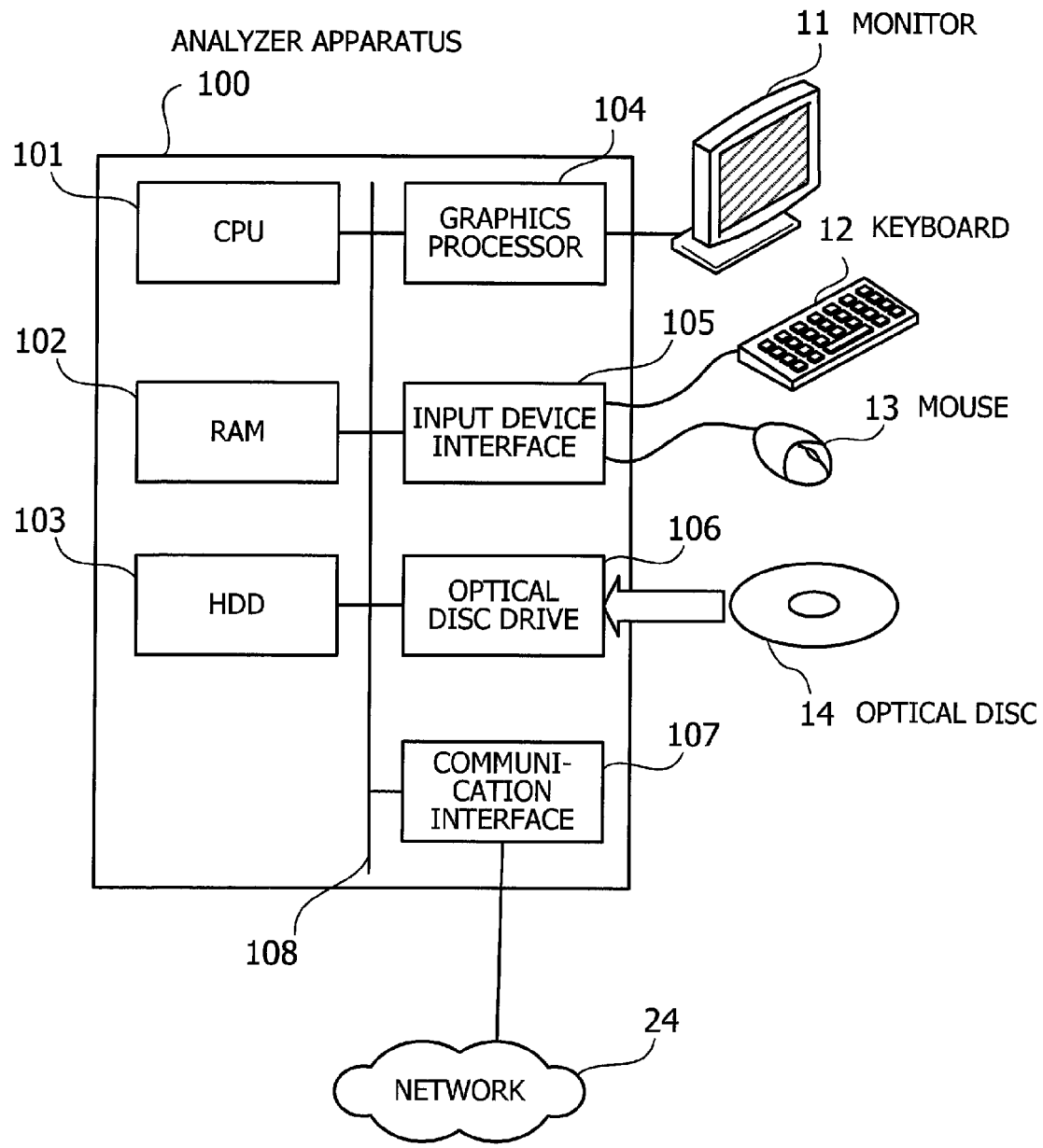
FIG. 3 exemplifies hardware of an analyzer apparatus according to the second embodiment.

For example, the analyzer apparatus 100 with the above features may be implemented on the following hardware platform. FIG. 3 exemplifies hardware of the analyzer apparatus 100 according to the second embodiment. The illustrated analyzer apparatus 100 has a CPU 101 to control its entire operation. The CPU 101 is connected to a random access memory (RAM) 102 and other various devices and interfaces on a bus 108.

The RAM 102 serves as a primary storage device of the analyzer apparatus 100. Specifically, the RAM 102 is used to temporarily store at least some of the operating system (OS) programs and application programs that the CPU 101 executes, as well as other various data objects that it manipulates at runtime. Other devices on the bus 108 include an HDD 103, a graphics processor 104, an input device interface 105, an optical disc drive 106, and a communication interface 107.

The HDD 103 writes and reads data magnetically on its internal platters. The HDD 103 serves as a secondary storage device of the analyzer apparatus 100 to store program and data files of the operating system and applications. Flash memory and other semiconductor memory devices may also be used as secondary storage, similarly to the HDD 103.

The graphics processor 104, coupled to a monitor 11, produces video images in accordance with drawing commands from the CPU 101 and displays them on a screen of the monitor 11. The monitor 11 may be, for example, a cathode ray tube (CRT) display or a liquid crystal display.

The input device interface 105 is connected to input devices such as a keyboard 12 and a mouse 13 and supplies signals from those devices to the CPU 101. The mouse 13 is a pointing device, which may be replaced with other kind of pointing devices such as touchscreen, tablet, touchpad, and trackball.

The optical disc drive 106 reads out data encoded on an optical disc 14, by using laser light. The optical disc 14 is a portable data storage medium, the data recorded on which can be read as a reflection of light or the lack of the same. The optical disc 14 may be a digital versatile disc (DVD), DVD-RAM, compact disc read-only memory (CD-ROM), CD-Recordable (CD-R), or CD-Rewritable (CD-RW), for example.

The communication interface 107 is connected to the network 24 to exchange data with the application server 42 or the first and second capturing devices 44 and 45 over the second network 24.

The above-described hardware platform may be used to implement the processing functions of the second embodiment and other embodiments. The same hardware platform of FIG. 3 is also applicable to the foregoing information processing apparatus 1 of the first embodiment.

Figure 4:
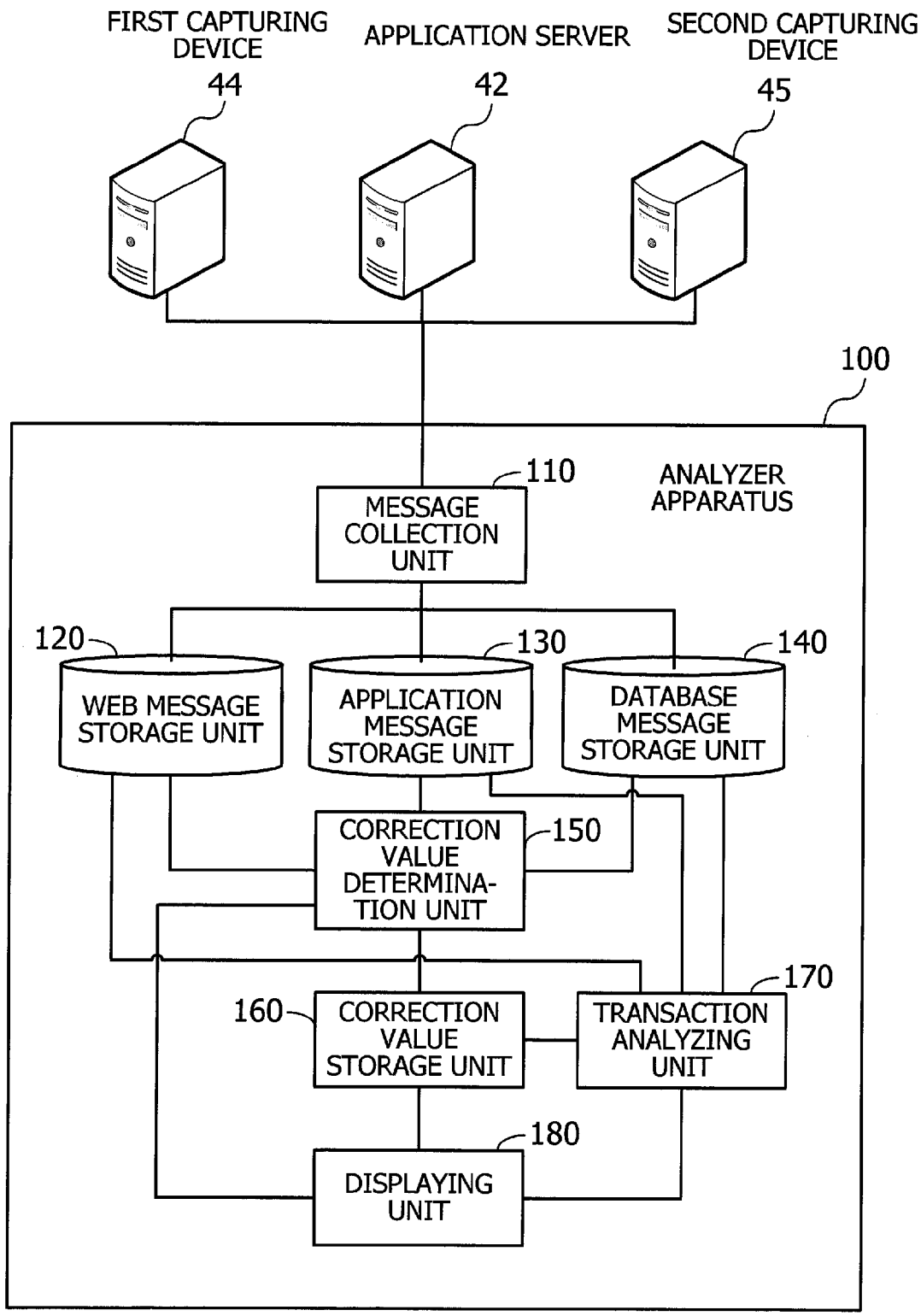
FIG. 4 is a block diagram exemplifying functions of the analyzer apparatus.

FIG. 4 is a block diagram exemplifying functions of the analyzer apparatus 100. The illustrated analyzer apparatus 100 includes a message collection unit 110, a web message storage unit 120, an application message storage unit 130, a database message storage unit 140, a correction value determination unit 150, a correction value storage unit 160, a transaction analyzing unit 170, and a displaying unit 180.

The message collection unit 110 collects messages from the application server 42 and each capturing device 44 and 45. For example, the message collection unit 110 receives web messages recorded in the first capturing device 44 and stores them in the web message storage unit 120. The message collection unit 110 also receives application messages recorded in the application server 42 and stores them in the application message storage unit 130. The message collection unit 110 further receives database messages recorded in the second capturing device 45 and stored them in the database message storage unit 140.

The web message storage unit 120 stores web messages exchanged between each terminal device 31 to 33 and the web server 41. For example, the web message storage unit 120 may be implemented as part of storage space of the RAM 102 or HDD 103.

The application message storage unit 130 stores application messages exchanged between the web server 41 and application server 42. For example, the application message storage unit 130 may be implemented as part of storage space of the RAM 102 or HDD 103.

The database message storage unit 140 stores database messages exchanged between the application server 42 and database server 43. For example, the database message storage unit 140 may be implemented as part of storage space of the RAM 102 or HDD 103.

The correction value determination unit 150 calculates correction values for correcting time information (time stamps), which may be inconsistent among web messages, application messages, and database messages. The correction value determination unit 150 stores the calculated correction values in the correction value storage unit 160.

The correction value storage unit 160 stores correction values for correcting time information, which may be inconsistent among web messages, application messages, and database messages. More specifically, one correction value is to solve the inconsistency between web messages and application messages, and another correction value is to solve the inconsistency between application messages and database messages.

The transaction analyzing unit 170 corrects the time stamp of each message by using a relevant correction value stored in the correction value storage unit 160 and sorts the messages in temporal order based on the corrected time values. The transaction analyzing unit 170 then searches the resulting time series of messages to find those transmitted in relation to a single transaction and associates the found messages with each other. The transaction analyzing unit 170 analyzes the records of these associated messages to calculate transaction processing times of each server. For example, the aforementioned Japanese Laid-open Patent Publication No. 2006-011683 discloses several techniques relating to message-based transaction analysis.

The displaying unit 180 displays correction values for message time stamps, as well as other information such as the result of an analysis performed by the transaction analyzing unit 170.

It is noted that the lines interconnecting the functional blocks in FIG. 4 represent some of their communication paths. The person skilled in the art would appreciate that there may be other communication paths in actual implementations.

With the above-described functions, the analyzer apparatus 100 reproduces transactions actually executed in the web three-layer system of interest. The analyzer apparatus 100 analyzes these transactions as will be described in detail later.

The message collection unit 110 in FIG. 4 is an example of the collecting unit 1c previously discussed in FIG. 1 for the first embodiment. The correction value determination unit 150 is an example of the associating unit 1d in combination with the determining unit 1e previously discussed in FIG. 1. The web message storage unit 120 is an example of the first memory 1a previously discussed in FIG. 1. The application message storage unit 130 acts as an example of the second memory 1b previously discussed in FIG. 1, when it is used to determine a correction value for correcting inconsistency between web messages and application messages. The application message storage unit 130 acts as an example of the first memory 1a previously discussed in FIG. 1, when it is used to determine a correction value for correcting inconsistency between application messages and database messages. The database message storage unit 140 is an example of the second memory 1b previously discussed in FIG. 1.

Figure 5:
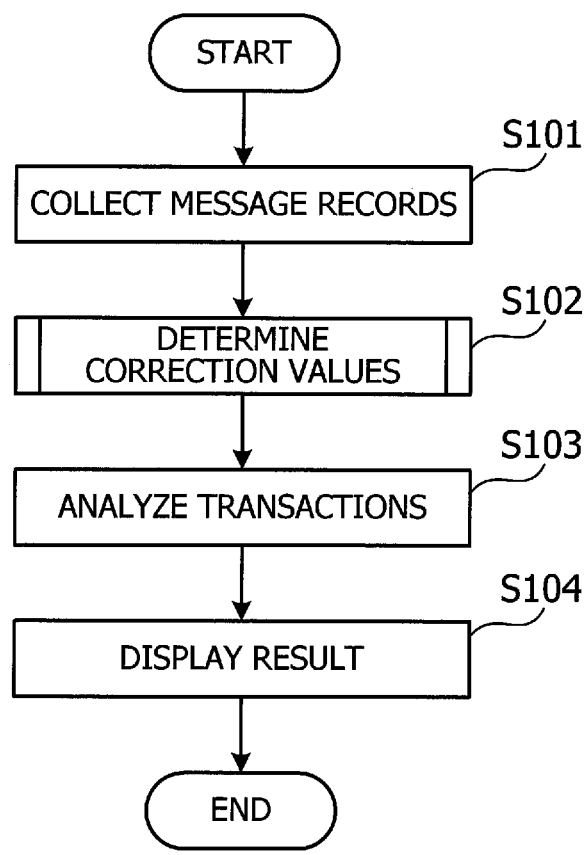
FIG. 5 is a flowchart illustrating a procedure of transaction analysis.

The analyzer apparatus 100 performs transaction analysis in the way described below. FIG. 5 is a flowchart illustrating how the analyzer apparatus 100 analyzes transactions. Each operation in this procedure will be explained in the order of step numbers.

(Step S101) The message collection unit 110 collects message records from the application server 42 and each capturing device 44 and 45. For example, the message collection unit 110 starts collecting message records in response to a transaction analysis command from an administrator of the system. More specifically, the message collection unit 110 receives message records from the first capturing device 44 and stores them in the web message storage unit 120. The message collection unit 110 also receives message records from the application server 42 and stores them in the application message storage unit 130. The message collection unit 110 further receives message records from the second capturing device 45 and stores them in the database message storage unit 140.

(Step S102) The correction value determination unit 150 examines the collected message records layer by layer and calculates correction values for correcting the recorded time, or time stamp, of each message. For example, the correction value determination unit 150 calculates a correction value for correcting the time of application messages with respect to the time of web messages. Similarly, the correction value determination unit 150 calculates a correction value for correcting the time of database messages with respect to the time of application messages. The correction value determination unit 150 stores calculated correction values in the correction value storage unit 160. The details of this step will be described later with reference to FIG. 9.

(Step S103) The transaction analyzing unit 170 consults the correction value storage unit 160 to recognize which correction values to use for each group of messages. When reading out messages from the web message storage unit 120, application message storage unit 130, and database message storage unit 140, the transaction analyzing unit 170 corrects their time stamps before subjecting them to transaction analysis.

(Step S104) The displaying unit 180 displays the result of the transaction analysis. The displaying unit 180 may also present some information indicating on what basis the correction value determination unit 150 has calculated time correction values.

Figure 6:
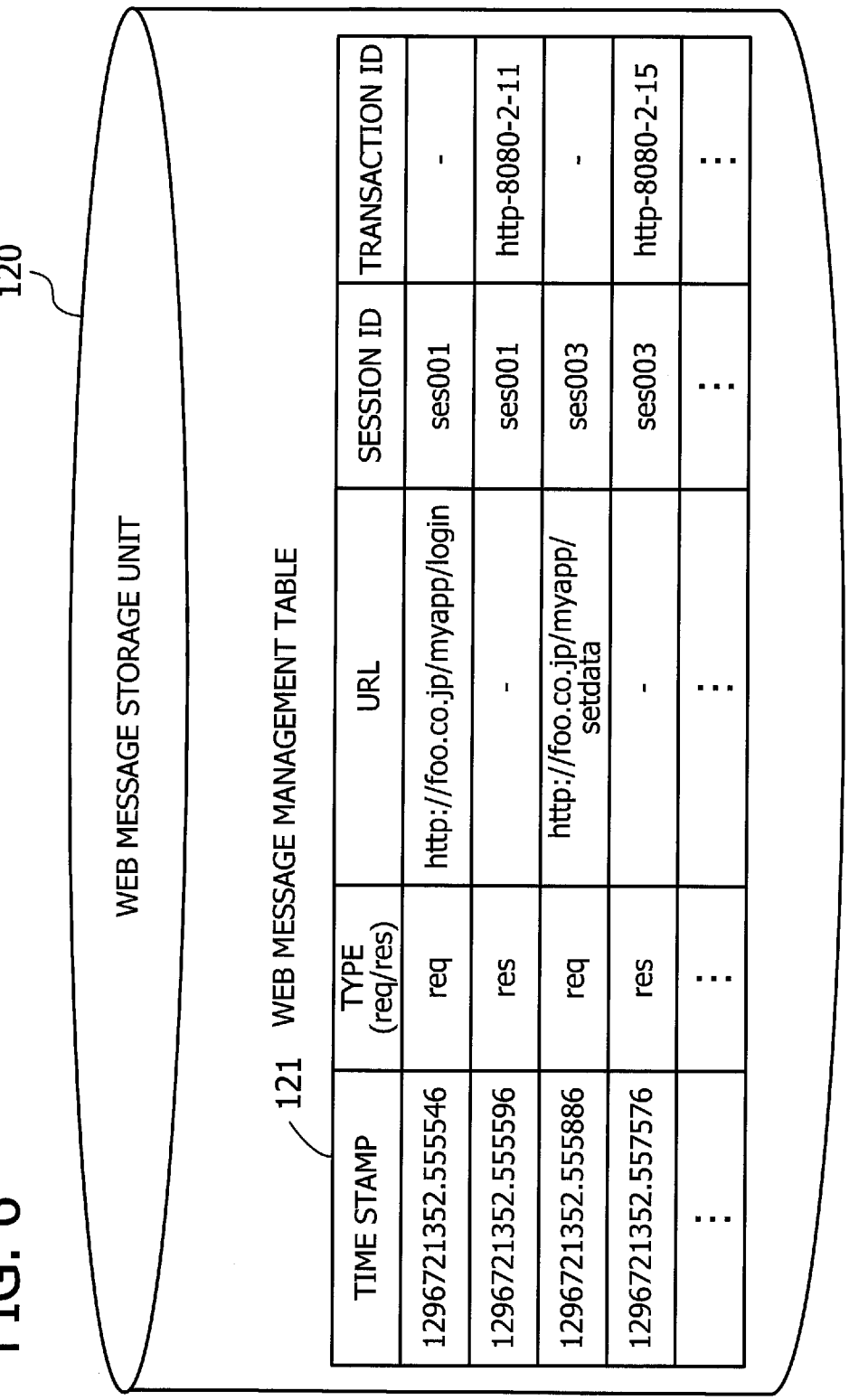
FIG. 6 exemplifies a data structure of a web message storage unit.
Figure 8:
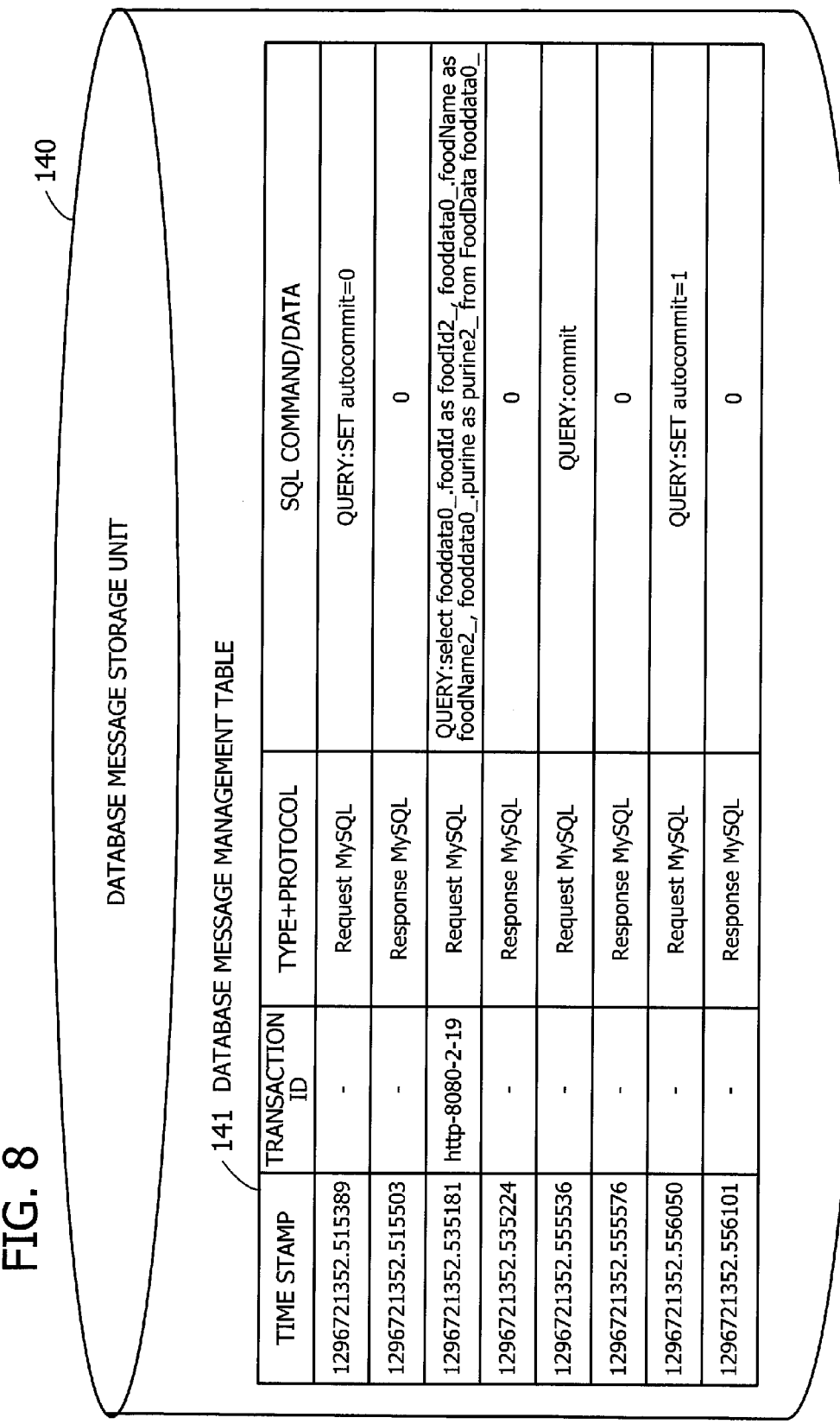
FIG. 8 exemplifies a data structure of a database message storage unit.

Referring now to FIGS. 6 to 8, the following section will describe message records collected by the message collection unit 110.

FIG. 6 exemplifies a data structure of a web message storage unit 120. The illustrated web message storage unit 120 stores a web message management table 121, which is formed from the following data fields: "Time Stamp," "Type," "URL" (Uniform Resource Locator), "Session ID," and "Transaction ID." Each row of this web message management table 121 represents a record describing a particular web message.

The time stamp field contains a time stamp of a web message, which indicates at what time the first capturing device 44 received the message. This time stamp is based on the internal clock of the first capturing device 44.

The type field contains a value indicating the type of the web message. For example, the type field may indicate whether the web message in question is a request message or a response message. Referring to the example of FIG. 6, the type field contains a value of "req" for request messages and "res" for response messages.

The URL field contains a URL that indicates the destination of an access request. This field is populated in the case of request messages.

The session ID field contains a session ID uniquely identifying a communication session established between a terminal device 31 to 33 and the web server 41. When a request message and a response message have the same session ID, these messages indicate the start time and end time of a particular process that was invoked by the request message. Such a combination of request and response messages are referred to as a "message pair."

The transaction ID contains a transaction ID uniquely identifying a transaction executed in response to a request from terminal devices. For example, a transaction ID is present in a response message, one of two messages constituting a message pair. This transaction ID uniquely indicates a particular transaction to which the process corresponding to the message pair belongs.

FIG. 7 exemplifies a data structure of an application message storage unit 130. The application message storage unit 130 stores an application message management table 131, which is formed from the following data fields: "Start/End," "Transaction ID," "Time Stamp," "Class Name," and "Method Name." Each row of this application message management table 131 represents a record that describes a particular application message.

The start/end field contains a flag that indicates whether the application server 42 received a request message that could invoke a process in the application server 42 itself or transmitted a response message indicating a result of a finished process. In the former case, the start/end field is given a flag value of "S" denoting the start of a process. In the latter case, the start/end field is given a flag value of "E" denoting the end of a process.

The transaction ID contains the transaction ID of a transaction that corresponds to a process executed in the application server 42. The time stamp field contains a time stamp of the message received or transmitted by the application server 42. The class name field indicates a class name of the noted process executed in the application server 42 as part of a transaction. The method name field indicates a method name of the same.

Each process executed in the application server 42 is demarcated by a starting application message and an ending message that have the same transaction ID, class name, and method name. Suppose that two application messages, one with a flag value of "S" and the other with a flag value of "E," are found to have the same transaction ID, class name, and method name. In this case, their time stamps indicate the execution period of a process corresponding to the transaction ID.

Referring to the example of FIG. 7, the application message management table 131 contains a plurality of starting application messages whose transaction IDs are identical. This fact indicates that the web server 41 transmitted a request message to the application server 42 several times during the execution of a single transaction.

FIG. 8 exemplifies a data structure of a database message storage unit 140. The illustrated database message storage unit 140 contains a database message management table 141, which is formed from the following data fields: "Time Stamp," "Transaction ID," "Type+Protocol," and "SQL Command/Data." Each row of this database message management table 141 represents a record describing a particular database message.

The time stamp field of a record contains a time stamp that the second capturing device 45 gave to the database message. The transaction ID field contains a transaction ID that was given to the database message. The type+protocol field indicates whether the database message is a request message or response message, as well as what protocol is used in the database message. The SQL command/data field presents an SQL command and its associated data contained in the database message.

The layer-specific message records described above in FIGS. 6 to 8 serve as source data for transaction analysis. The analyzer apparatus 100 of the second embodiment calculates correction values for message time stamps before starting transaction analysis. The procedure of this calculation will now be described in detail below.

Figure 9:
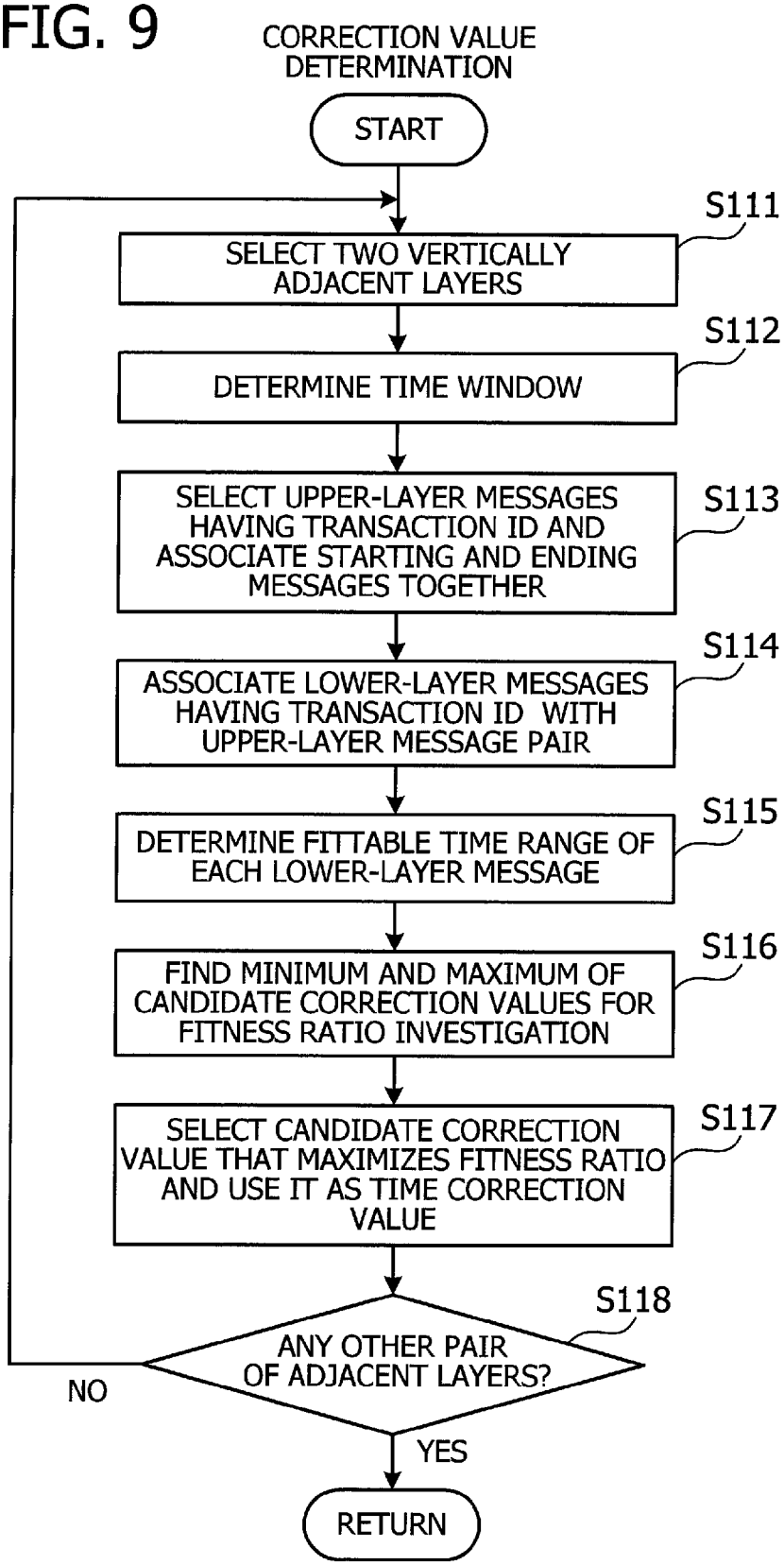
FIG. 9 is a flowchart illustrating a procedure of determining correction values.

FIG. 9 is a flowchart illustrating a procedure of determining correction values. Each operation seen in FIG. 9 is described below in the order of step numbers.

(Step S111) The correction value determination unit 150 selects a pair of vertically adjacent layers that have not yet been subjected to the calculation of time correction values. For example, the correction value determination unit 150 selects web layer and application layer, or application layer and database layer.

(Step S112) The correction value determination unit 150 determines a time window. The time window refers to a range of time within which the message records are analyzed for determination of correction values. For example, the correction value determination unit 150 examines time stamps of the messages captured from the selected layers to figure out the oldest time and latest time recorded in them. The correction value determination unit 150 then sets up a time window with a predetermined width (e.g., one minute) somewhere between the oldest time and the latest time.

(Step S113) The correction value determination unit 150 searches message records of the upper one of the currently selected two layers to find and select a message that has a transaction ID and whose time stamp falls within the time window determined above. The selected message is related to a certain process, and there is supposed to be another related message, where the two messages indicate the start and end of that process. The correction value determination unit 150 then associates such starting and ending messages together. These associated upper-layer messages are referred to as an "upper-layer message pair" or simply a "message pair." There may be a plurality of such upper-layer message pairs.

Referring to, for example, the web layer messages illustrated in FIG. 6, the type field of each message record indicates whether the message is a request message ("req") or a response message ("res"). A request message represents the start of a process, while a response message represents the end of a process. When two messages have the same session ID, it means that they are related to the same process.

Referring to the application-layer message records illustrated in FIG. 7, a message having a flag value of "S" indicates the start of a process, and a message having a flag value of "E" indicates the end of a process. The correction value determination unit 150 associates such starting and ending messages together when they have the same transaction ID, the same class name, and the same method name. The time stamps of these associated messages give the start time and end time of the process indicated by the messages.

(Step S114) Turning now to the lower one of the selected two layers, the correction value determination unit 150 finds messages having a transaction ID and associates them with an upper-layer message pair having the same transaction ID.

(Step S115) The correction value determination unit 150 determines a fittable time range of each lower-layer message. More specifically, the fittable time range of a lower-layer message is a range of correction values that, if applied, would permit the time of that message to fit in a time period whose start and end are indicated by its associated upper-layer message pair. This calculation is performed for each individual lower-layer message having a transaction ID in the given time window.

Note that the following description may use the expression "transaction ID is fittable" or the like to mean that the time stamp of a lower-layer message having that transaction ID fits within a time period whose start and end are indicated by an upper-layer message pair having the same transaction ID.

(Step S116) The correction value determination unit 150 determines the lower end and upper end of candidate correction values for use in the subsequent investigation of fitness ratios. Suppose here that there are lower-layer messages each having a transaction ID. The time stamp of such a lower-layer message, if it is corrected with a particular correction value, may fit in the execution time period of an upper-layer process having the same transaction ID as the lower-layer message. The term "fitness ratio" refers to the ratio of such fitting lower-layer messages to the whole population of lower-layer messages having a transaction ID.

The lower end of candidate correction values is determined by checking the fittable time range of each lower-layer message and finding a minimum candidate correction value in those fittable time ranges. Similarly, the upper end of candidate correction values is determined by checking the fittable time range of each lower-layer message and finding a maximum candidate correction value in those fittable time ranges. Suppose, for example, that three lower-layer messages have their respective fittable time ranges of "+0.05 to +0.15," "−0.01 to +0.09," and "+0.07 to +0.16". The minimum candidate correction value "−0.01" in this example is found in the second fittable time range. The maximum candidate correction value "0.16" is found in the third fittable time range. Accordingly, the investigation of fitness ratios will be performed in the range of −0.01 to +0.16. This range is referred to as the "fitness investigation range." The fitness ratio means the quotient of the number of messages whose transaction IDs are fittable over the total number of lower-layer messages having a transaction ID.

(Step S117) Within the fitness investigation range demarcated by the lower end and upper end determined at step S116, the correction value determination unit 150 evaluates each candidate correction value in terms of the fitness ratio, thereby selecting a correction value that maximizes the fitness ratio. For example, the correction value determination unit 150 produces a series of candidate correction values by dividing the fitness investigation range by a predetermined step size (e.g., 0.01 seconds). With each of these candidate correction value, the correction value determination unit 150 evaluates the fitness ratio, i.e., what fraction of the lower-layer messages includes the candidate correction value in question in its fittable time range. The correction value determination unit 150 determines a candidate correction value that gives the highest fitness ratio and selects that candidate as the correction value. The correction value determination unit 150 then stores the selected correction value in the correction value storage unit 160, in conjunction with the currently selected pair of layers (i.e., upper layer and lower layer).

(Step S118) The correction value determination unit 150 determines whether there is any other pair of vertically adjacent layers that has not yet been subjected to the above steps of correction value determination. The correction value determination unit 150 returns to step S111 when such a pending layer pair is present. When correction values are determined for every pair of vertically adjacent layers, the correction value determination unit 150 exits from the present routine of FIG. 9 and returns to step S103 in FIG. 5.

The above-described processing steps permit the correction value determination unit 150 to determine appropriate correction values for correcting time differences between vertically adjacent layers. The next section of the description presents an example of correction value determination in the case where the application layer and database layer are referred to respectively as the upper layer and lower layer (i.e., the application server 42 performs upper-layer processes, while the database server 43 performs lower-layer processes).

Figure 10:
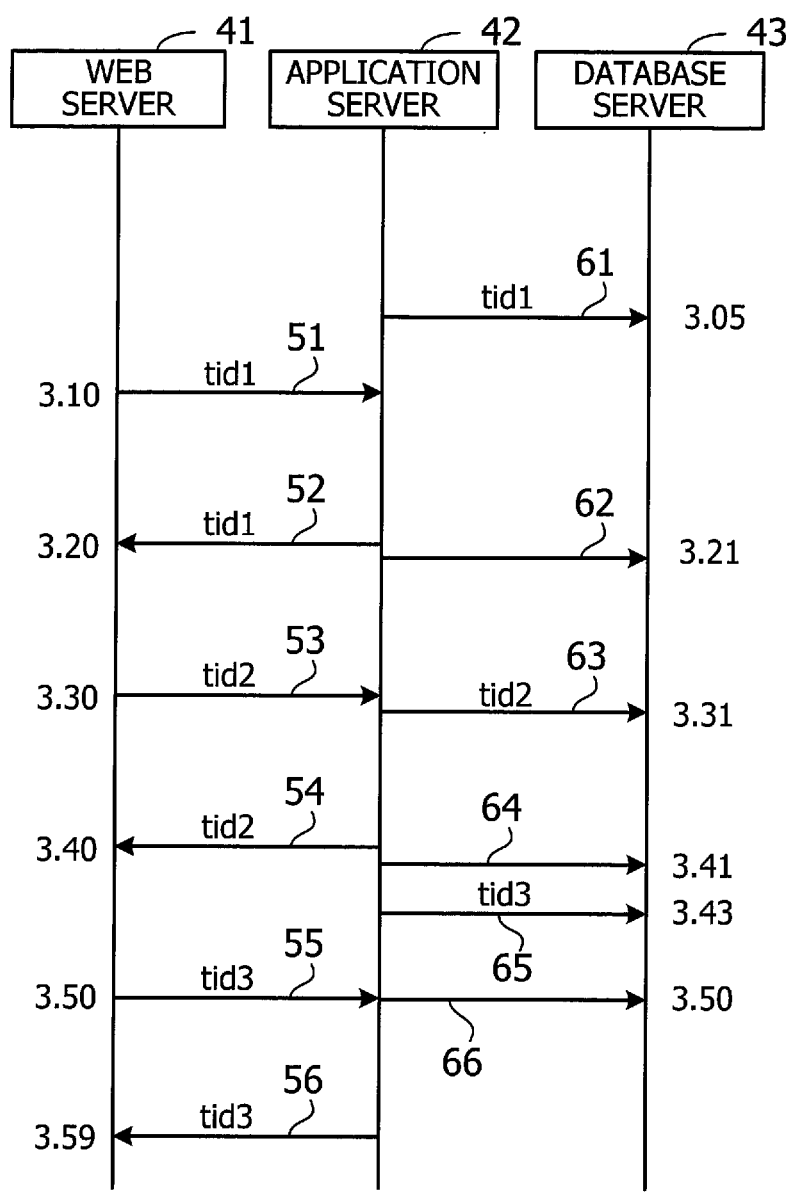
FIG. 10 exemplifies messages detected by the analyzer apparatus.

FIG. 10 exemplifies messages detected by the analyzer apparatus. Specifically FIG. 10 illustrates a time series of messages exchanged among servers, which include messages 51 to 56 between the web server 41 and application server 42 and messages 61 to 66 between the application server 42 and database server 43. Some of these messages contain a transaction ID while others do not. In FIG. 10, such transaction IDs are placed above the symbols representing individual messages. The following description uses the term "application-layer stream" to refer to the time series of messages 51 to 56 exchanged between the web server 41 and application server 42. Similarly, the term "database-layer stream" refers to the time series of messages 61 to 66 exchanged between the application server 42 and database server 43.

The messages 51 to 56 of the application-layer stream have been reproduced from records collected from the application server 42. What is seen on the left of each application-layer message 51 to 56 in FIG. 10 is its time stamp expressed in units of seconds. These time stamps represent the reading of an internal clock of the application server 42 at the moment of detection of each message.

On the other hand, the messages 61 to 66 of the database-layer stream have been reproduced from records collected from the second capturing device 45. What is seen on the right of each database-layer message 61 to 66 in FIG. 10 is its time stamp expressed in units of seconds. These time stamps represent the reading of an internal clock of the second capturing device 45 at the moment of detection of each message.

The correction value determination unit 150 analyzes these layer-specific message streams seen in FIG. 10. Specifically, the correction value determination unit 150 first associates each starting message in the application layer (upper layer) with its corresponding ending message, based on their common transaction ID. For example, the correction value determination unit 150 associates a request message 51 at "3.10" with its corresponding response message 52 at "3.20" in FIG. 10.

The correction value determination unit 150 further associates a lower-layer message having a transaction ID in the database-layer stream with upper-layer messages having the same transaction ID in the application-layer stream. For example, the correction value determination unit 150 associates a request message 61 at "3.05" in the database-layer stream with messages 51 and 52 in the application-layer stream.

Then, based on the associated messages in different layers, the correction value determination unit 150 determines a fittable time range of each lower-layer message so that its time stamp may fit within the start-to-end period of its associated upper-layer messages having the same transaction ID with the lower-layer message. The correction value determination unit 150 temporarily stores the determined fittable time range in, for example, the RAM 102.

Figure 11:
FIG. 11 exemplifies fittable time range information.

FIG. 11 exemplifies fittable time range information. Each entry (row) of the illustrated fittable time range information 151 includes information about a message pair in the application layer and its associated message in the database layer. The application-layer message pair is formed from a starting message and an ending message, and the information seen in the fittable time range information 151 indicates a range of time (or start-to-end period) given by the time stamps of these two messages, together with their transaction ID. As to the corresponding database-layer message, the fittable time range information 151 indicates its time stamp and transaction ID. As can be seen from FIG. 11, the application-layer message pair and its corresponding database-layer message have the same transaction ID. The illustrated fittable time range information 151 further indicates a fittable time range in conjunction with each database-layer message.

Referring to, for example, the topmost entry of messages having a transaction ID "tid1" in FIG. 11, the application-layer message pair gives a start-to-end period of "3.10 to 3.20" in units of seconds (s), and its corresponding database-layer message has a time stamp of "3.05" (s). The fittable time range of this entry is therefore "+0.05 to +0.15" (s). That is, it is possible to modify the time stamp of the database-layer message by some amount of time in this range, without causing the time stamp to fall outside the period between start and end times of the upper-layer message pair.

Referring to the second entry of messages having a transaction ID of "tid2" in FIG. 11, the application-layer message pair gives a start-to-end period of "3.30 to 3.40" (s), and its corresponding database layer message has a time stamp of "3.31" (s). The fittable time range of this entry is therefore "−0.01 to +0.09" (s).

Referring to the third entry of messages having a transaction ID of "tid3" in FIG. 11, the application-layer message pair gives a start-to-end period of "3.50 to 3.59" (s), and its corresponding database layer message has a time stamp of "3.43" (s). The fittable time range of this entry is therefore "+0.07 to +0.16" (s).

Three fittable time ranges have been obtained above. Here the second one with a transaction ID of "tid2" gives a minimum value "−0.01," and the third one with a transaction ID of "tid3" gives a maximum value "+0.16". These minimum and maximum values (or the lower and upper end of candidate correction values) demarcate the fitness investigation range in this case. The correction value determination unit 150 divides this fitness investigation range by a predetermined step size, thus obtaining a plurality of candidate correction values. The correction value determination unit 150 then calculates a fitness ratio of transaction IDs by using each candidate correction value. The result of this fitness ratio investigation is temporarily stored in, for example, the RAM 102.

FIG. 12 exemplifies an investigation result of fitness ratios. The illustrated investigation result 152 of fitness ratios presents, for each of the candidate correction values, a fitness ratio that has been calculated and fitness flags indicating whether the transaction IDs are fittable or not. The fitness flags are arranged in several columns assigned to different transaction IDs. More specifically, the fitness flag associated with a candidate correction value is set to one when the corresponding transaction ID is fittable.

Referring to the example of FIG. 12, the investigation of fitness ratios has been performed on different candidate correction values at the intervals of 0.01 seconds, from −0.01 to 0.16. Fitness ratios of these candidates have been calculated as follows.

First, see the smallest candidate correction value "−0.01" for instance. While three database-layer messages 61, 63, and 65 with have their transaction IDs (see FIG. 10), the second message 63 with a transaction ID of "tid2" is the only database-layer message that includes the candidate correction value "−0.01" in its fittable time range. In other words, the transaction ID is fittable in only one message 63 out of three messages 61, 63, and 65. Accordingly, the fitness ratio of this candidate correction value "−0.01" is calculated to be one over three (33.3%).

For another instance, a mid-range candidate correction value "0.08" in FIG. 12 is included in all the three fittable time ranges of the three database-layer messages 61, 63, and 65 noted above. Accordingly, the fitness ratio of this candidate correction value "0.08" is calculated to be three over three (100%).

Similarly, the fitness ratio of yet another candidate correction value "0.10" is calculated to be 66.7%. The fitness ratio of still another candidate correction value "0.16" is calculated to be 33.3%.

As can be seen from the FIG. 12, the highest fitness ratio is 100% in this example, which is achieved with candidate correction values in the range of 0.07 to 0.09. Every candidate correction value in this highest fitness range is expected to work well for the purpose of correcting message time stamps. For example, a candidate correction value "0.08" at the midpoint of the range may be used as the correction value. The determination of correction values may incorporate some heuristic knowledge. For example, the correction value may be set to 0.07 when it is known that the time stamp correction tends to work more properly with correction values in the lower-end portion of the highest fitness range. Correction values determined in this way are then sent to the correction value storage unit 160.

Figure 13:
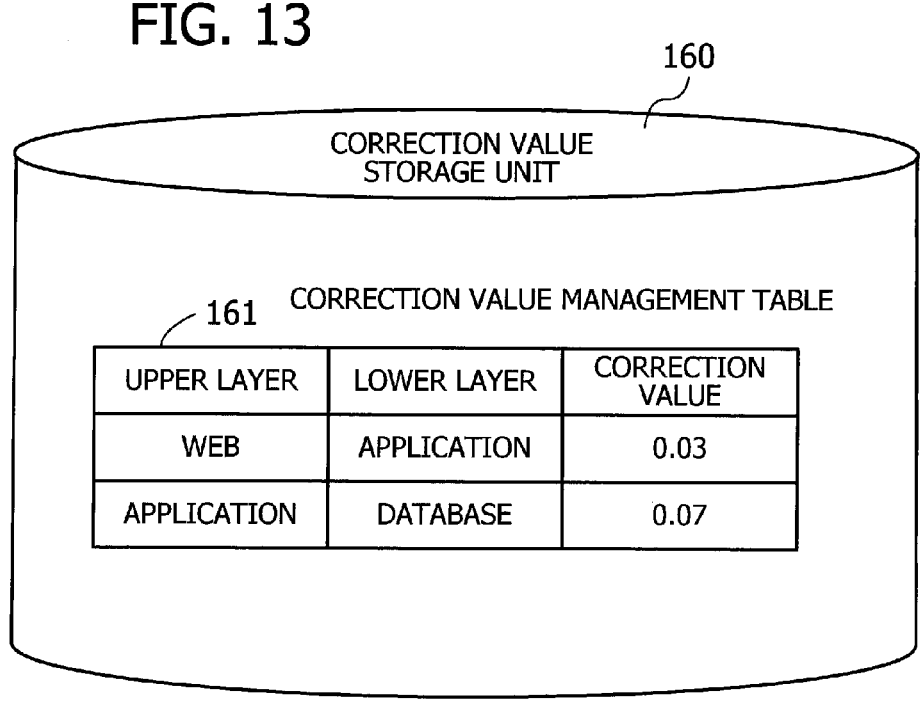
FIG. 13 exemplifies a data structure of a correction value storage unit.

FIG. 13 exemplifies a data structure of the correction value storage unit 160. The illustrated correction value storage unit 160 contains a correction value management table 161, which is formed from the following data fields: "Upper Layer," "Lower Layer," and "Correction Value." The upper layer field of each table entry contains the name of an upper one of two vertically adjacent layers to which a correction value is assigned. The lower layer field contains the name of a lower one of two vertically adjacent layers to which a correction value is assigned. The correction value field contains a correction value used to correct message time stamps in one of the layers indicated by the upper layer and lower layer fields. For example, this correction value is used to correct time stamps of lower-layer messages.

In the example of FIG. 13, a correction value of "0.03" is used to cancel time differences between web layer and application layer. Another correction value of "0.07" is used to cancel time differences between application layer and database layer.

The transaction analyzing unit 170 receives correction values determined by the correction value determination unit 150 and uses them to correct time stamps of collected messages before starting a transaction analysis with those messages. The correction may be performed with reference to the time information stored in, for example, the web message storage unit 120, meaning that no change will be made to the time information of message records in the web message storage unit 120. The transaction analyzing unit 170, on the other hand, adds 0.03 seconds to time information in each message record retrieved from the application message storage unit 130. The transaction analyzing unit 170 also adds 0.10 seconds (=0.03+0.07) to time information in each message record retrieved from the database message storage unit 140. The time correction permits a lower-layer message having a transaction ID to fall within the start-to-end period of an upper-layer message pair having the same transaction ID.

Figure 14:
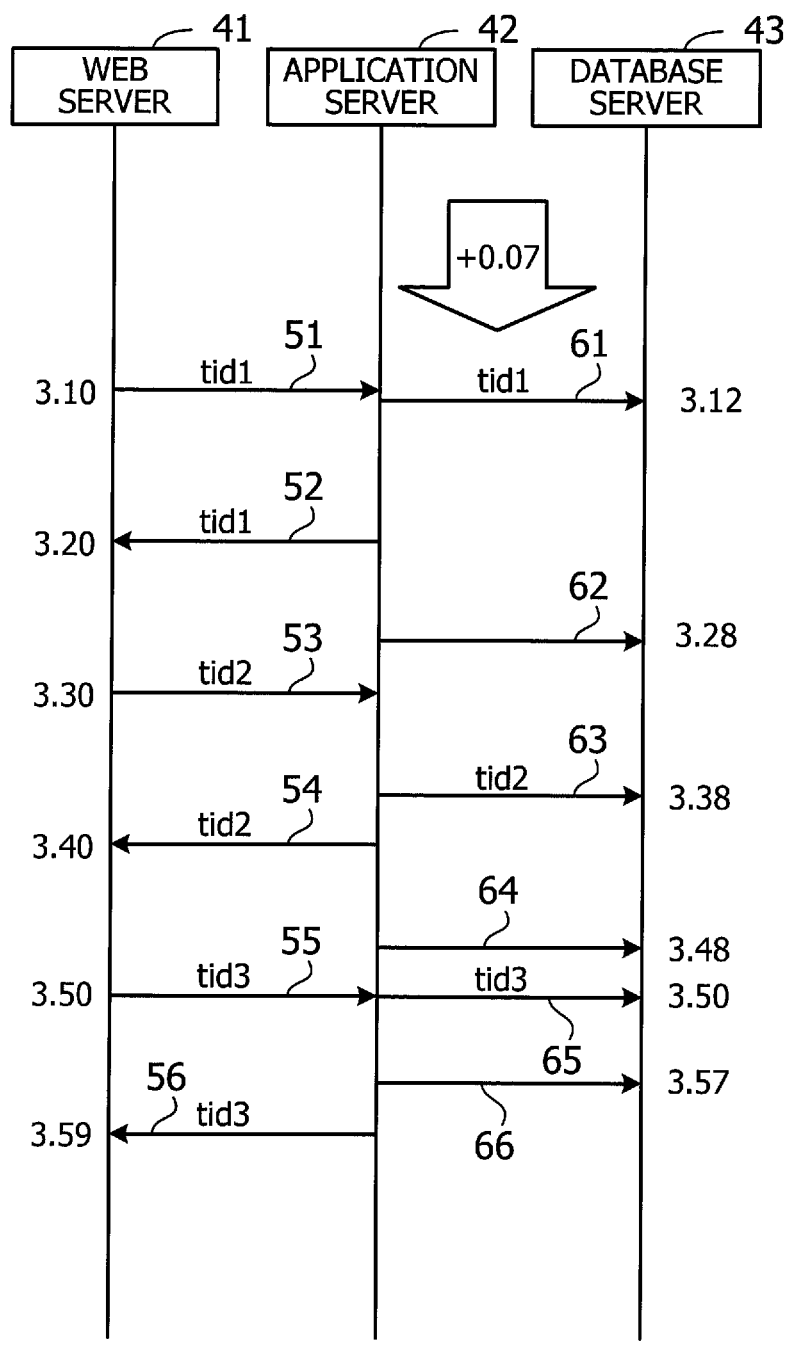
FIG. 14 exemplifies messages with corrected time stamps.

FIG. 14 exemplifies messages with corrected time stamps. This example illustrates database layer messages 61 to 66 whose time stamps have been corrected with a correction value of "+0.07". That is, the transaction analyzing unit 170 has added 0.07 seconds to the original time stamp of each message 61 to 66. As a result, the first database-layer message 61 with a transaction ID "tid1" now resides in the start-to-end period of its corresponding upper-layer message pair (i.e., messages 51 and 52 with the same transaction ID "tid1"). Likewise, the third database-layer message 63 with a transaction ID "tid2" resides in the start-to-end period of its corresponding upper-layer message pair (messages 53 and 54). The fifth database-layer message 65 with a transaction ID "tid3" resides in the start-to-end period of its corresponding upper-layer message pair (messages 55 and 56).

Transaction analysis is performed on the basis of message records with corrected time stamps. The proposed time correction techniques make it possible to properly distinguish each set of messages constituting a single transaction.

The displaying unit 180 may be configured to obtain the investigation result 152 of fitness ratios (see FIG. 12) from the correction value determination unit 150 and produce a fitness ratio graph for display on the monitor 11. This fitness ratio graph depicts source data from which the correction values for time stamps have been determined.

Figure 15:
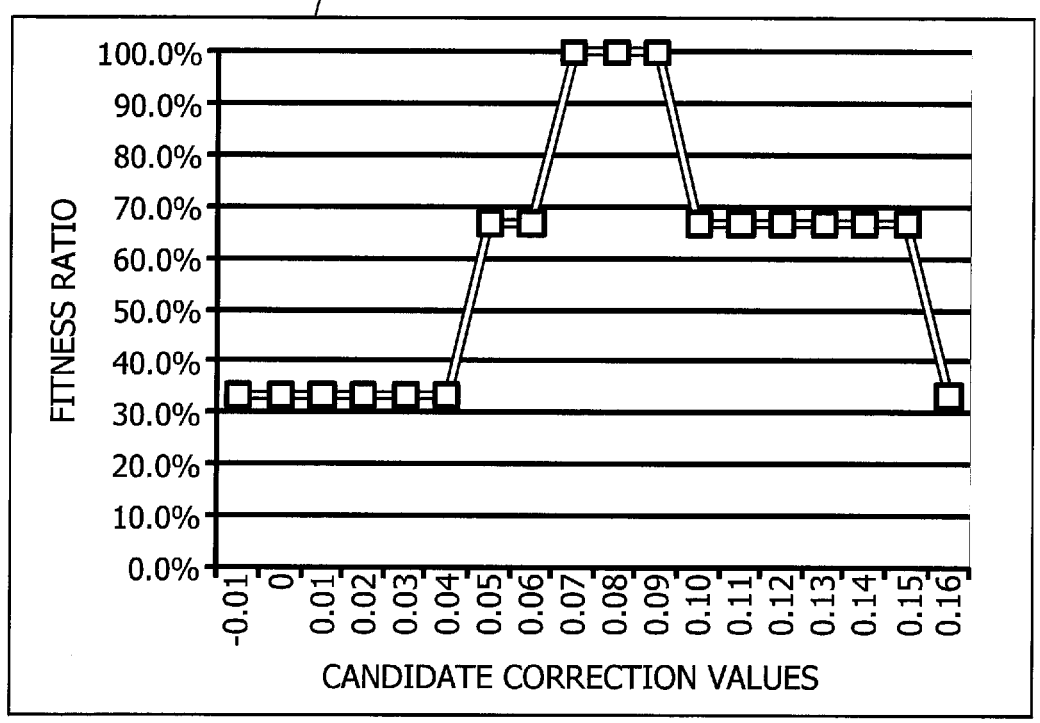
FIG. 15 is an example of a fitness ratio graph displayed on a monitor screen.

FIG. 15 is an example of a fitness ratio graph displayed on a monitor screen. The horizontal axis of this fitness ratio graph 81 represents candidate correction values, and the vertical axis represents fitness ratios. The fitness ratio graph 81 is a line chart depicting how the fitness ratio varies with the correction value.

The user of the analyzer apparatus 100 sees the fitness ratio graph 81 of FIG. 15 and recognizes that the fitness ratio reaches 100% in the range "0.07 to 0.09" of candidate correction values. The user thus understands the reason for the choice of correction values that the analyzer apparatus 100 has made for correction of message time stamps.

Figure 16:
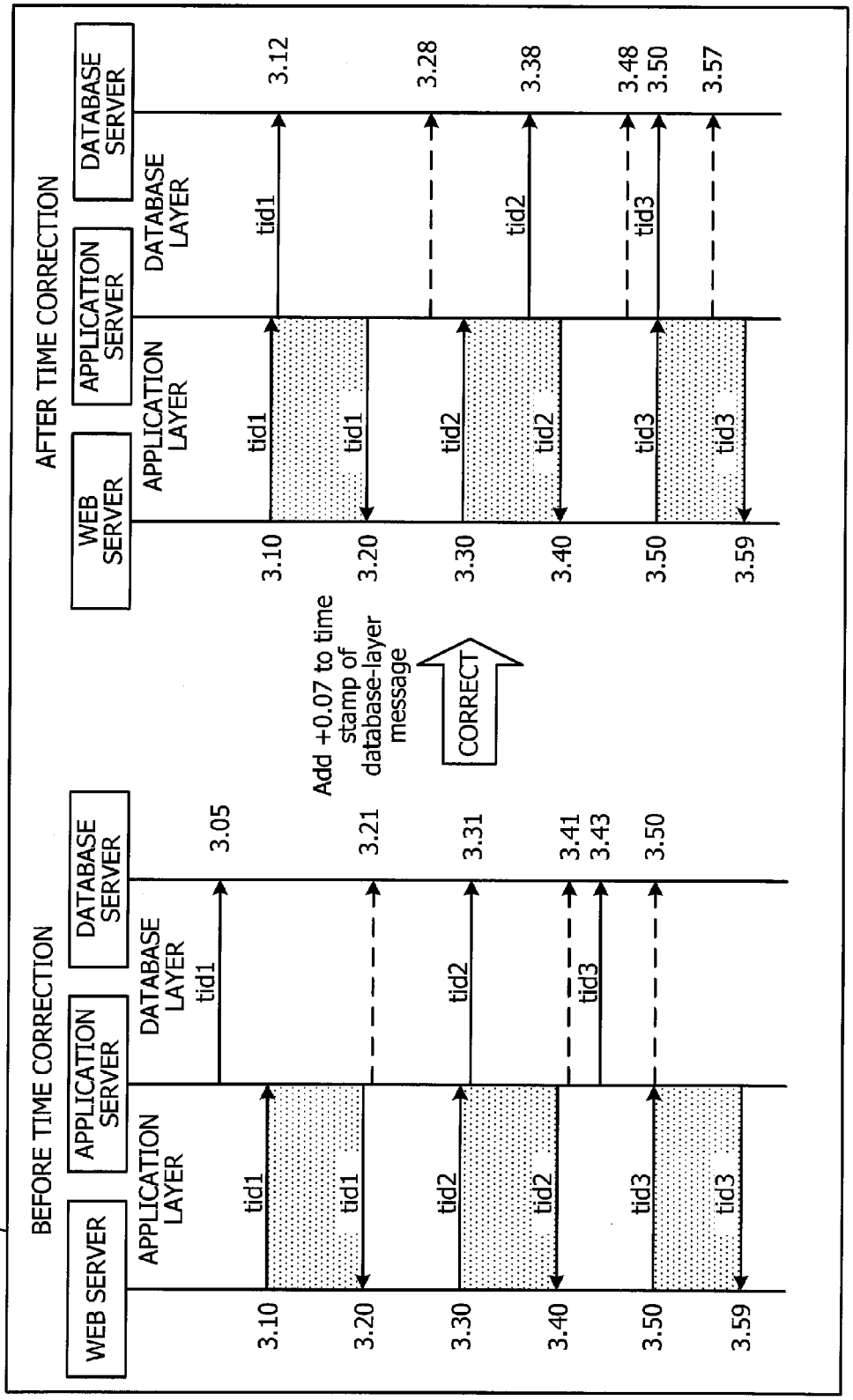
FIG. 16 is an example of a containment relationship diagram displayed on a monitor screen.

The displaying unit 180 may also be configured to display a containment relationship diagram on the monitor 11 to provide containment relationships of messages illustrated in FIG. 14. For example, FIG. 16 is a containment relationship diagram displayed on a monitor screen. The containment relationship diagram 82 is formed from two sets of message streams, one for before and the other for after the time correction. The containment relationship diagram 82 permits the user to confirm that the time correction has done its work properly. That is, the user can see that, with the corrected time stamps, the lower-layer messages having a transaction ID are each contained in the start-to-end period of their corresponding upper-layer message pair.

As can be seen from the above description, the second embodiment is designed to determine correction values so as to achieve a maximum fitness ratio. This feature of the second embodiment enables correction of time information in the message records whose time stamps were added by different devices in different layers. The problem of inconsistent time information may exist even within a single layer in the case where the time stamps are added by different processes with different timing in the layer. The second embodiment properly corrects this type of time differences as well. When applied to transaction analysis, the proposed techniques make it possible to reproduce a series of transactions more accurately, thus contributing to enhanced confidence of the analysis results.

(c) Third Embodiment

This section describes a third embodiment, which calculates correction values in consideration of coverage ratios, in addition to fitness ratios. The term "coverage ratio" refers to a share of lower-layer messages whose corrected time stamps fall in the start-to-stop periods of upper-layer message pairs. It is noted that the coverage ratio reflects not only the number of messages having transaction IDs, but also the number of messages having no transaction IDs.

The system configuration discussed in FIGS. 2 to 4 for the second embodiment may similarly be used to implement a system according to the third embodiment. The following description of the third embodiment will focus on its difference from the second embodiment, while using the reference numerals of element seen in FIGS. 2 to 4.

Figure 17:
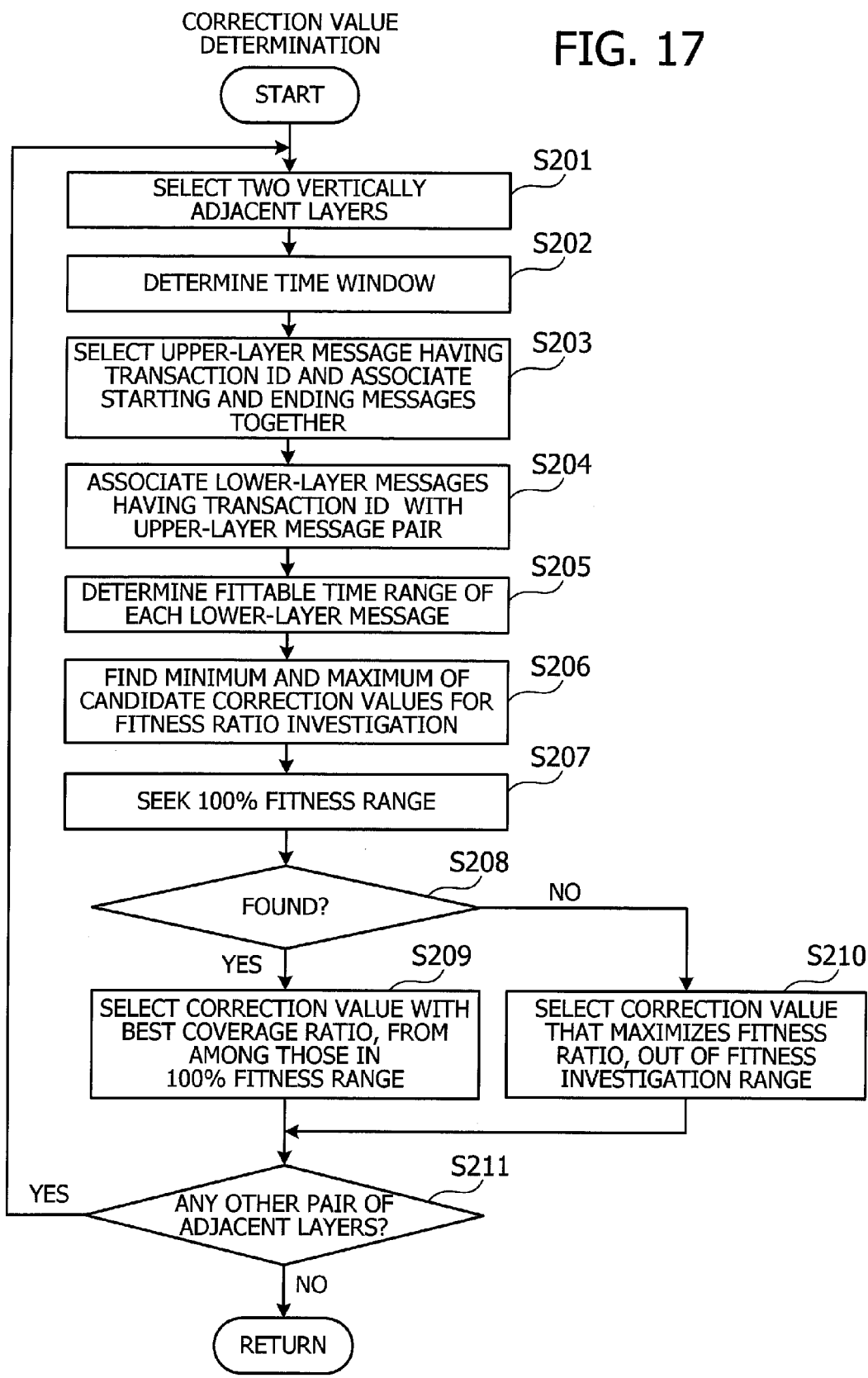
FIG. 17 is a flowchart exemplifying a procedure of determining correction values according to a third embodiment.

The third embodiment is different from the second embodiment in its way of determining correction values. FIG. 17 is a flowchart exemplifying a procedure of determining correction values according to the third embodiment. Note that steps S201 to S206 and S211 in FIG. 17 are similar to steps S111 to S116 and S118 discussed previously in FIG. 9 for the second embodiment. The following description explains modified or added steps in the third embodiment in the order of step numbers.

(Step S207) Within the fitness investigation range determined at step S206, the correction value determination unit 150 evaluates each candidate correction value in terms of the fitness ratio of transaction IDs, thereby finding correction values that give a full fitness ratio (100%). Actually, these full-fitness correction values are equivalent to an overlapping portion of the fittable time ranges obtained at step S205 for all lower-layer messages in the given time window. The flowchart of FIG. 17 refers to this overlapping portion as the "100% fitness range."

(Step S208) When such a 100% fitness range is found in the fittable time ranges, the correction value determination unit 150 advances to step S209. When no such ranges are found, the correction value determination unit 150 proceeds to step S210.

(Step S209) The correction value determination unit 150 divides the found 100% fitness range by a predetermined step size (e.g., 0.01 seconds), thereby obtaining a plurality of correction values. The correction value determination unit 150 then calculates a coverage ratio for each correction value.

Coverage ratios are calculated as follows. Let B represent the number of lower-layer request messages in the given time window. Some of these B request messages fall in any of the start-to-end periods of upper layer transaction pairs. Let A represent the number of lower-layer request messages that meet the above condition. The coverage ratio is then calculated as the quotient of A over B. The quotient A/B may be expressed in units of percent.

While the above coverage ratios are calculated from data about lower-layer request messages, it is not intended to limit the embodiments by that specific example. As an alternative, coverage ratios may be calculated based on all messages in the lower layer. More specifically, let D represent the number of lower-layer messages in the given time window, including request messages and whatever in the layer. Then let C represent a subset of these D messages whose members fall in any of the start-to-end periods of upper layer transaction pairs. The coverage ratio is then calculated to be C/D.

Out of the above-noted 100% fitness range, the correction value determination unit 150 selects a corresponding value that gives the best (highest) coverage ratio for use in the subsequent message time stamp correction. The correction value determination unit 150 then advances to step S211.

(Step S210) Since no correction values provide a 100% fitness ratio, the correction value determination unit 150 then selects a correction value that maximizes the fitness ratio of transaction IDs, out of the fitness investigation range demarcated by the lower end and upper end of the fittable time ranges. The correction value determination unit 150 then advances to step S211.

The above processing operations permit the correction value determination unit 150 to select correction values for message time stamps based on both the fitness ratios and coverage ratios. The correction value determination unit 150 uses, for example, the RAM 102 to store the fitness ratios and coverage ratios investigated at steps S209 and S210.

FIG. 18 exemplifies an investigation result of fitness ratios and coverage ratios. The illustrated investigation result 153 of fitness ratios and coverage ratios presents the following information for each different candidate correction value: fitness ratio, fitness flags, message containment flags, and coverage ratio. Fitness flags indicate the status of each transaction ID as to whether it is fittable or not. Message containment flags indicate the status of each message as to whether it is contained in any of the start-to-stop periods. In other words, this investigation result 153 is produced by adding containment flags and coverage ratio of each candidate correction value to the investigation result 152 of fitness ratios illustrated in FIG. 12.

The message containment flags are provided in association with message identifiers (msg#1 to msg#6) of lower-layer messages. More specifically, the message containment flag of a message is set to one when the time stamp of that message is within the start-to-stop period of an upper-layer message pair.

Referring to the investigation result 153 in FIG. 18, the fitness ratio reaches 100% for candidate correction values in the range of 0.07 to 0.09. To narrow down the candidates, the correction value determination unit 150 then evaluates their respective coverage ratios. The investigation result 153 indicates that the coverage ratio is 66.7% (=4/6) for two candidate correction values, 0.07 and 0.08, and 100% for one candidate correction value, 0.09. In view of this fact, the correction value determination unit 150 chooses 0.09 as the correction value for time stamps of lower-layer messages.

While the above example has only one candidate correction value with the coverage ratio of 100%, there may actually be two or more such candidate values (e.g., when the coverage ratio becomes 100% in the range of 0.07 to 0.09). In this case, the correction value determination unit 150 selects an appropriate one of these candidates. For example, a candidate correction value "0.08" at the midpoint of the range may be used, or a heuristic approach may be used to choose a correction value. For example, a correction value may be selected from among those in the lower-end portion of the 100% fitness range.

The transaction analyzing unit 170 receives correction values determined by the correction value determination unit 150 and uses them to correct time stamps of collected messages before starting a transaction analysis with those messages. As a result of this time stamp correction, each lower-layer message having a transaction ID now fits within the start-to-end period of its corresponding upper-layer message pair having the same transaction ID. Similarly, each lower-layer message having no transaction IDs fits within the start-to-end period of a certain upper-layer message pair.

Figure 19:
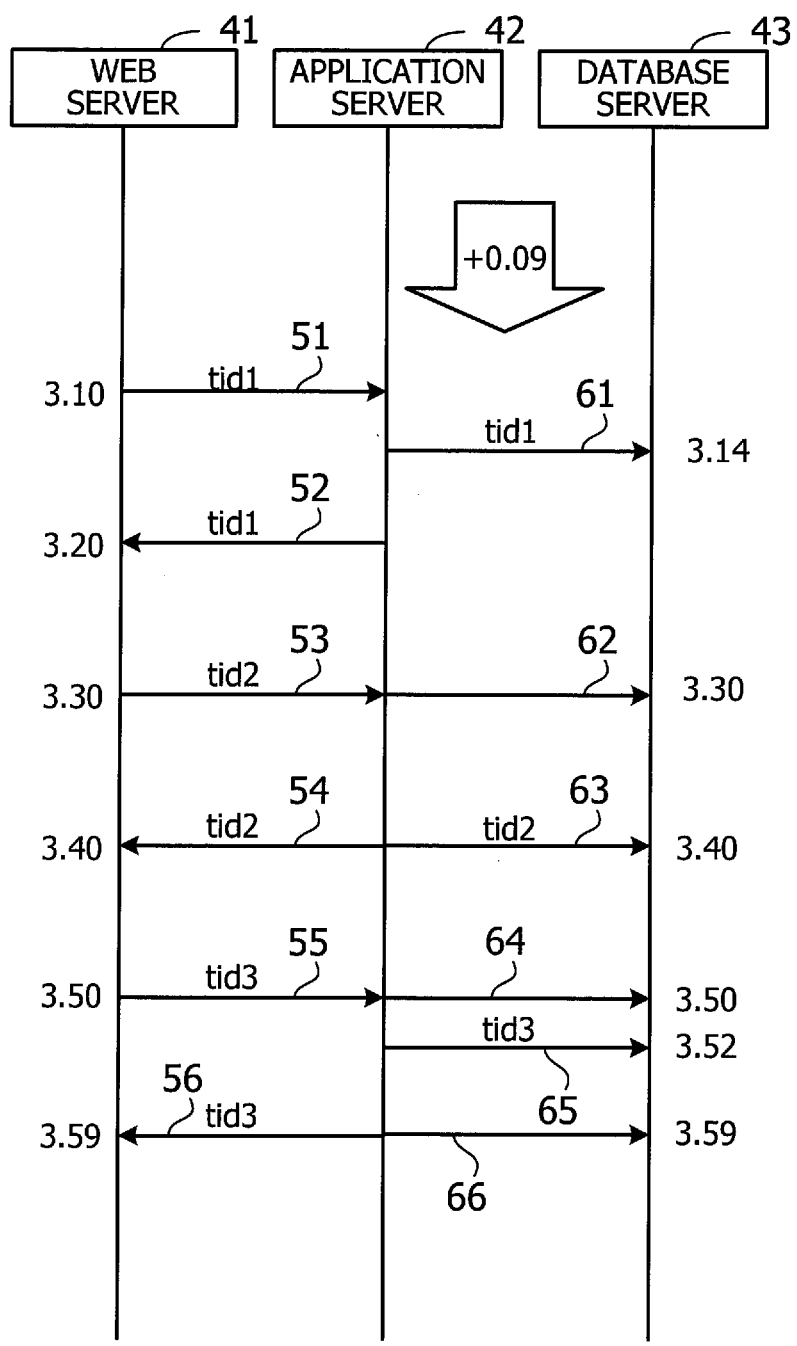
FIG. 19 exemplifies time-corrected messages.

FIG. 19 exemplifies time-corrected messages. The database-layer messages 61 to 66 seen in FIG. 19 have been corrected with the correction value of +0.09 selected above. That is, the time stamp of each database-layer message 61 to 66 has been added a time of 0.09 seconds. As a result, each lower-layer message 61, 63, and 65 having a transaction ID is now contained in the start-to-end period of its corresponding upper-layer message pair sharing the same transaction ID with the lower-layer message. It is also noted that every lower-layer message 61 to 66 seen in FIG. 19 is contained in one of the start-to-end periods of three upper-layer message pairs.

Transaction analysis is performed on such message records with corrected time stamps. The proposed time correction techniques make it possible to properly distinguish each set of messages constituting a single transaction.

The displaying unit 180 may obtain the investigation result 153 of fitness ratios and coverage ratios (see FIG. 18) from the correction value determination unit 150 and produce a graph of fitness ratios and coverage ratios for display on the monitor 11. This graph depicts source data from which the correction values for time stamps were determined.

Figure 20:
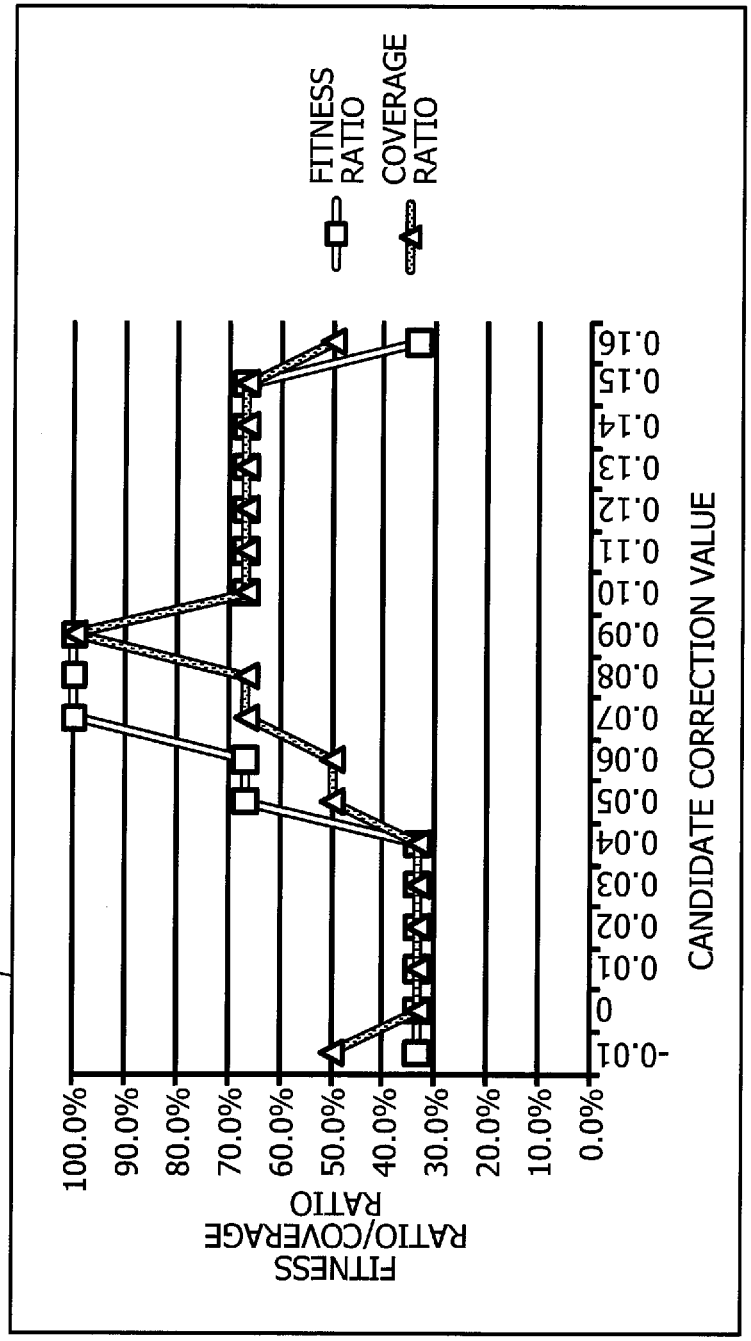
FIG. 20 exemplifies a graph of fitness ratios and coverage ratios displayed on a monitor screen.

FIG. 20 exemplifies a graph of fitness ratios and coverage ratios displayed on a monitor screen. The illustrated graph 83 plots fitness ratios and coverage ratios in the vertical axis, against a range of candidate correction values in the horizontal axis. This graph 83 is a line chart depicting how the fitness ratio and coverage ratio vary with the correction value.

The user of the analyzer apparatus 100 sees the graph 83 of FIG. 20 and recognizes that the fitness ratio reaches 100% in the range "0.07 to 0.09" of correction values. The user also sees that "0.09" is the only correction value that offers a coverage ratio of 100%. The user thus understands the reason for the choice of a correction value that the analyzer apparatus 100 has made for correction of message time stamps.

Figure 21:
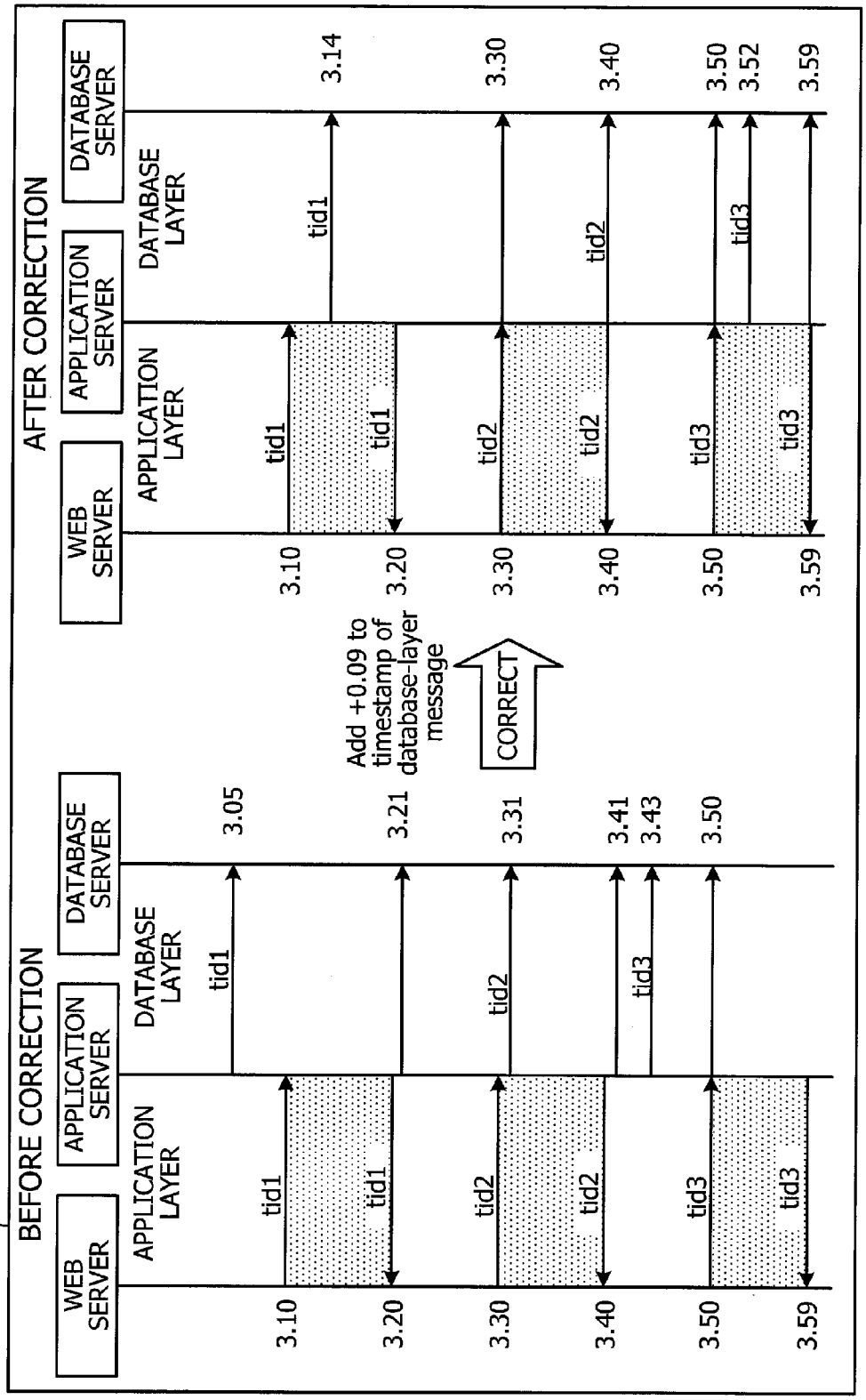
FIG. 21 is an example of a containment relationship diagram displayed on a monitor screen.

The displaying unit 180 may also be configured to display a containment relationship diagram on the monitor 11 to provide containment relationships of messages illustrated in FIG. 19. For example, FIG. 21 gives a containment relationship diagram displayed on a monitor screen. This containment relationship diagram 84 is formed from two sets of message streams, one for before and the other for after the time correction. The containment relationship diagram 84 permits the user to see that, with the corrected time stamps, the lower-layer messages having a transaction ID are each contained in the start-to-end period of their corresponding upper-layer message pair. The user can also see that, with the corrected time stamps, the other lower-layer messages are each contained in the start-to-end period of a certain upper-layer message pair.

As can be seen from the above description, the third embodiment is designed to determine correction values so as to achieve a maximum coverage ratio of messages, in addition to 100% fitness. This feature of the third embodiment enables correction of inconsistent time information in the message records whose time stamps were added by different devices in different layers. The problem of inconsistent time information may exist even within a single layer in the case where the time stamps are added by different processes with different timing in the layer. The third embodiment properly corrects this type of time differences as well. When applied to transaction analysis, the proposed techniques make it possible to reproduce a series of transactions more accurately, thus contributing to enhanced confidence of the analysis results.

(d) Fourth Embodiment

Figure 22:
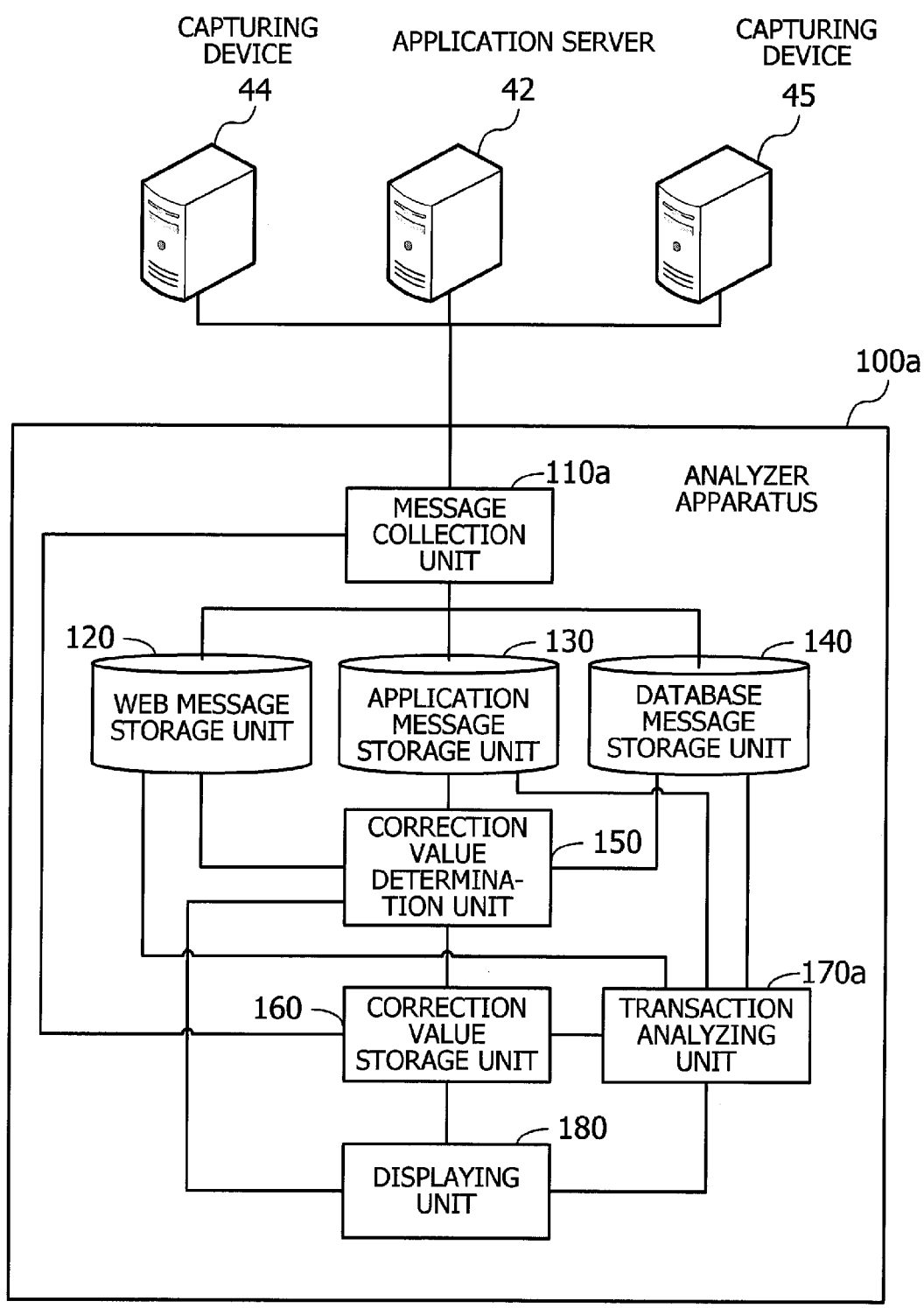
FIG. 22 is a block diagram exemplifying functions of an analyzer apparatus according to a fourth embodiment.

This section describe a fourth embodiment which corrects time information of messages when they are collected and recorded. FIG. 22 is a block diagram exemplifying functions of an analyzer apparatus according to the fourth embodiment. Several elements of the fourth embodiment operate similarly to their counterparts in the second embodiment. The following description refers to such similar elements by using the same reference numerals used in the second embodiment. See the previous description for details of those elements.

The illustrated analyzer apparatus 100*a* of the fourth embodiment differs from the second embodiment in its message collection unit 110*a* and transaction analyzing unit 170*a*. The message collection unit 110*a* of the fourth embodiment retrieves correction values stored in the correction value storage unit 160 when it collects message records from the first and second capturing devices 44 and 45, as well as from the application server 42. With the correction values, the message collection unit 110*a* corrects time information in the collected message records and stores the corrected records in the web message storage unit 120, application message storage unit 130, or database message storage unit 140.

Suppose, for example, that the correction value storage unit 160 stores correction values as seen in FIG. 13, and that the message collection unit 110*a* corrects application-layer messages and database-layer messages with respect to the time information of web-layer messages. In this case, the records of web-layer messages are simply sent to the web message storage unit 120, with no changes in their time information. The records of application-layer messages, on the other hand, are corrected by adding a correction value of 0.03 seconds before they are sent to the application message storage unit 130. The records of database-layer messages are also corrected by adding a correction value of 0.10 seconds (=0.03+0.07) before they are sent to the database message storage unit 140. The transaction analyzing unit 170*a* of the fourth embodiment performs transaction analysis on those messages records, without the need for correcting their time information.

The fourth embodiment reduces the processing load of transaction analysis since the message records are corrected at the time of message collection. The fourth embodiment also enables the use of some other transaction processing software that has no functions for correcting message time information. In other words, the fourth embodiment ensures the confidence of transaction analysis even with such software that lacks time correction capabilities.

(e) Other Embodiments

While the above-described second, third, and fourth embodiments correct time information of lower-layer message records, the embodiments may be modified in this aspect because time differences are relative in nature. That is, the proposed time correction may be applied to upper-layer messages. It is also possible to correct messages in both the upper and lower layers.

The calculation of fitness ratios in the second, third, and fourth embodiments ignores response messages in the lower layer. These embodiments may be modified to take those response messages into consideration. For example, the correction value determination unit 150 may be configured to seek a response message corresponding to a lower-layer request message having a transaction ID and associate these two messages together, thus producing a message pair. From this lower-layer message pair, the correction value determination unit 150 recognizes that a process was invoked by the request message at the time indicated by a time stamp of that message. The correction value determination unit 150 also recognizes that the invoked process was ended at the time indicated by a time stamp of the response message. The execution period of the noted lower-layer process is between the above start and end times. The correction value determination unit 150 seeks an upper-layer message pair having the same transaction ID as the lower-layer message pair, and it calculates a range of correction values with which the execution period of the lower-layer process is contained in the start-to-stop period of the upper-layer message pair. The correction value determination unit 150 assigns the calculated range to the lower-layer message pair as its fittable time range. The correction value determination unit 150 then calculates fitness ratios based on this modified version of fittable time range. Response messages in the lower layer are thus reflected in the fitness ratios.

Referring again to the second embodiment, the foregoing transaction analyzing unit 170 corrects time information in message records before starting transaction analysis. The message records may, however, be corrected previously by the correction value determination unit 150 while they are in storage units. This variation of second embodiment alleviates the processing load of the transaction analyzing unit 170.

The functions of the above-described embodiments may be implemented as a computer application. To achieve this implementation, one or more series of instructions describing the functions of the information processing apparatus 1 or analyzer apparatus 100 are encoded and provided in the form of computer programs. A computer system executes those programs to provide the processing functions discussed in the preceding sections. The programs may be encoded in a computer-readable medium for the purpose of storage and distribution. Such computer-readable storage media include magnetic storage devices, optical discs, magneto-optical storage media, semiconductor memory devices, and other tangible storage media. Magnetic storage devices include hard disk drives (HDD), flexible disks (FD), and magnetic tapes, for example. Optical disc media include DVD, DVD-RAM, CD-ROM, CD-RW, and others. Magneto-optical storage media include magneto-optical discs (MO), for example. Computer-readable storage media for computer programs do not include transitory media such as propagating signals.

Portable storage media, such as DVD and CD-ROM, are used for distribution of programs. Network-based distribution of software programs may also be possible, in which case a set of program files are made available on a server computer for downloading to other computers via a network.

For example, a computer stores various software components in its local storage device, which have previously been installed from a portable storage medium or downloaded from a server computer. The computer executes programs read out of the local storage device, thereby performing the programmed functions. Where appropriate, the computer may execute program codes read out of a portable storage medium, without installing them in its local storage device. Another alternative method is that the computer dynamically downloads programs from a server computer when they are demanded and executes them upon delivery.

It is further noted that the above-described processing functions may be executed wholly or partly by a digital signal processor (DSP), application-specific integrated circuit (ASIC), programmable logic device (PLD), or other electronic circuits, or their combinations.

According to one aspect of the embodiments, the proposed techniques make it possible to correct inconsistent time stamps of event records describing processes executed in different servers.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
   a memory; and
   a processor configured to perform a process including:
   communicating with a first server or a capturing device to collect requester event records, the capturing device being configured to capture and analyze a copy of message packets exchanged between the first server and a second server, the requester event records describing events that occurred in relation to processes executed in the first server as part of transactions, the requester event records each including time information indicating occurrence time of an event and a transaction identifier indicating a transaction that invoked that event,
   communicating with the second server or the capturing device to collect requestee event records, the requestee event records describing events that occurred in relation to processes executed in the second server in response to execution requests issued from the first server as part of the transactions, the requestee event records each including time information indicating occurrence time of an event in the second server and a transaction identifier indicating a transaction that invoked that event,
   storing the collected requester event records and requestee event records in the memory,
   searching the memory to find requester event records and requestee event records whose transaction identifiers are identical and associating the found requester event records with the found requestee event records,
   comparing the associated requester event records and requestee event records with each other in terms of the time information thereof, and
   determining a correction value for correcting time differences between the time information of the requester event records and the time information of the requestee event records, based on a result of the comparing.

2. The information processing apparatus according to claim 1, wherein the determining a correction value includes:
   producing an event record pair from two requester event records, one indicating start of a process executed in the first server and the other indicating end of the process, the two requester event records having a transaction identifier;
   determining an execution period of a process based on the time information in each requester event record constituting the event record pair;
   determining a fittable time range for a requestee event record having a same transaction identifier as the two requester event records constituting the event record pair, the fittable time range being a set of possible correction values which, when used to correct the time information of the requestee event record, make the corrected time information fit within the execution period; and
   selecting a value within the fittable time range as the correction value.

3. The information processing apparatus according to claim 2, wherein the determining a correction value includes:
   calculating the fittable time range for each requestee event record having a transaction identifier; and
   selecting a value from an overlapping portion of the fittable time ranges calculated for different requestee event records and determining the selected value as the correction value.

4. The information processing apparatus according to claim 2, wherein the determining a correction value includes:
   calculating the fittable time range for each requestee event record having a transaction identifier;
   calculating, for each candidate correction value for correction of the requestee event records, a first quotient of a number of requestee event records whose fittable time ranges contain said each candidate correction value over a total number of requestee event records; and
   selecting one of the candidate correction values that maximizes the first quotient and determining the selected candidate correction value as the correction value.

5. The information processing apparatus according to claim 4, wherein:

the process further includes storing unlabeled event records in the memory to record events occurred in relation to processes executed in the second server as part of the transactions, the unlabeled event records each including time information indicating occurrence time of an event, but lacking transaction identifiers;

the calculating a first quotient results in two or more candidate correction values that maximize the first quotient;

the determining a correction value includes:

calculating, for each of the two or more candidate correction values that maximize the first quotient, a second quotient of a number of fittable event records over a total number of requestee event records and unlabeled event records, the fittable event records being a set of requestee event records and unlabeled event records whose time information, when corrected with said each of the two or more candidate correction values, fits within the execution period of one of the processes executed in the first server; and selecting one of the two or more candidate correction values that maximizes the second quotient and determining the selected candidate correction value as the correction value.

6. The information processing apparatus according to claim 1, wherein the events occurred in relation to processes executed in the first server or second server include issuance of a request message that requests execution of a specific processing operation, as well as issuance of a response message corresponding to the request message.

7. The information processing apparatus according to claim 1, wherein the process further includes retrieving and analyzing the requester event records or requestee event records out of the memory while correcting the time information thereof with the determined correction value.

8. The information processing apparatus according to claim 1, wherein the process further includes collecting more requester event records and requestee event records and storing the collected requester event records and requestee event records in the memory while correcting the time information thereof with the determined correction value.

9. The information processing apparatus according to claim 4, wherein the process further includes displaying the first quotient calculated for each of the candidate correction values.

10. The information processing apparatus according to claim 5, wherein the process further includes displaying the first quotient and second quotient calculated for each of the candidate correction values.

11. The information processing apparatus according to claim 1, wherein the process further includes displaying temporal relationships among the requester event records and requestee event records whose time differences have been canceled by correcting the time information thereof with the determined correction value.

12. The information processing apparatus according to claim 1, wherein:

the first server and second server are part of a multiple-layer system that has multiple layers to execute transaction processing in a hierarchical manner; and the first server belongs to an upper one of two vertically adjacent layers of the multiple-layer system, while the second server belongs to a lower one of the two vertically adjacent layers.

13. A method for correcting time information, the method comprising:

communicating, by a processor, with a first server or a capturing device to collect requester event records, the capturing device being configured to capture and analyze a copy of message packets exchanged between the first server and a second server, the requester event records describing events that occurred in relation to processes executed in the first server as part of transactions, the requester event records each including time information indicating occurrence time of an event and a transaction identifier indicating a transaction that invoked that event;

communicating, by the processor, with the second server or the capturing device to collect requestee event records, the requestee event records describing events that occurred in relation to processes executed in the second server in response to execution requests issued from the first server as part of the transactions, the requestee event records each including time information indicating occurrence time of an event in the second server and a transaction identifier indicating a transaction that invoked that event;

storing, by the processor, the collected requester event records and requestee event records in a memory;

searching, by the processor, the memory to find requester event records and requestee event records whose transaction identifiers are identical and associating the found requester event records with the found requestee event records;

comparing, by the processor, the associated requester event records and requestee event records with each other in terms of the time information thereof; and determining, by the processor, a correction value for correcting time differences between the time information of the requester event records and the time information of the requestee event records, based on a result of the comparing.

14. A non-transitory computer-readable storage medium storing a program, the program causing a computer to perform a process comprising:

communicating with a first server or a capturing device to collect requester event records, the capturing device being configured to capture and analyze a copy of message packets exchanged between the first server and a second server, the requester event records describing events that occurred in relation to processes executed in the first server as part of transactions, the requester event records each including time information indicating occurrence time of an event and a transaction identifier indicating a transaction that invoked that event;

communicating with the second server or the capturing device to collect requestee event records, the requestee event records describing events that occurred in relation to processes executed in the second server in response to execution requests issued from the first server as part of the transactions, the requestee event records each including time information indicating occurrence time of an event in the second server and a transaction identifier indicating a transaction that invoked that event;

storing the collected requester event records and requestee event records in a memory;

searching the memory to find requester event records and requestee event records whose transaction identifiers are identical and associating the found requester event records with the found requestee event records;

comparing the associated requester event records and requestee event records with each other in terms of the time information thereof; and determining a correction value for correcting time differences between the time information of the requester event records and the time information of the requestee event records, based on a result of the comparing.

* * * * *